US011920588B2

(12) United States Patent
Sieber

(10) Patent No.: US 11,920,588 B2
(45) Date of Patent: Mar. 5, 2024

(54) COMPRESSOR FOR COMPRESSING HIGH-PRESSURED FLUIDS

(71) Applicant: Joseph David Sieber, Qualicum Beach (CA)

(72) Inventor: Joseph David Sieber, Qualicum Beach (CA)

( * ) Notice: Subject to any disclaimer, the term of this patent is extended or adjusted under 35 U.S.C. 154(b) by 0 days.

(21) Appl. No.: 17/565,093

(22) Filed: Dec. 29, 2021

(65) Prior Publication Data

US 2023/0204018 A1     Jun. 29, 2023

(51) Int. Cl.
*F04B 35/00*   (2006.01)
*F04B 9/103*   (2006.01)

(52) U.S. Cl.
CPC ............ *F04B 9/103* (2013.01); *F04B 35/004* (2013.01)

(58) Field of Classification Search
CPC .................................................... F04B 35/004
USPC .......................................... 417/61, 331, 337
See application file for complete search history.

(56) References Cited

U.S. PATENT DOCUMENTS

| | | | |
|---|---|---|---|
| 4,277,690 A | 7/1981 | Noren | |
| 4,754,157 A | 6/1988 | Windle | |
| 6,140,712 A | 10/2000 | Fredriksson et al. | |
| 7,690,900 B2 | 4/2010 | Sieber | |
| 7,836,689 B2 | 11/2010 | Sieber | |
| 7,980,832 B2 * | 7/2011 | Ahdoot | F03B 13/186 417/337 |
| 10,215,152 B2 | 2/2019 | Sieber et al. | |
| 2004/0217597 A1 | 11/2004 | Carroll et al. | |
| 2010/0034670 A1 * | 2/2010 | Smith | F03B 13/187 417/331 |
| 2012/0126540 A1 | 5/2012 | Healy | |
| 2013/0154267 A1 | 6/2013 | Healy | |
| 2015/0266549 A1 | 9/2015 | Qu | |

(Continued)

FOREIGN PATENT DOCUMENTS

| | | | | |
|---|---|---|---|---|
| EP | 1933026 A1 * | 6/2008 | ............ | F03B 13/187 |
| FR | 3034816 B1 * | 9/2018 | ............ | F03B 13/187 |
| WO | 2014088484 A1 | 6/2014 | | |

OTHER PUBLICATIONS

International Search Report & Written Opinion of related PCT/CA2022/051871 dated Feb. 24, 2023.

*Primary Examiner* — Thomas Fink
(74) *Attorney, Agent, or Firm* — Calderon, Safran & Cole P.C.

(57) ABSTRACT

A compressor assembly for further pressurizing pressurized fluid using motion of waves, the pressurized fluid being pressurized by a previous compressor assembly, is provided. The compressor assembly includes: a compression piston having a first side and a second side; a first rod portion coupled to a buoyant member coupled to the first side of the compression piston, wherein movement of the buoyant member is transferred, via the first rod portion, into movement of the compression piston between a top and bottom end of a compression chamber; and a second rod portion coupled to the second side of the compression piston and including a terminal surface, wherein the second portion is sized such that the terminal surface is located within an equalizer assembly during an entire range of motion of the compression piston. A diameter of the second portion is equal to or greater than a diameter of the first portion.

20 Claims, 18 Drawing Sheets

(56) References Cited

U.S. PATENT DOCUMENTS

2015/0275849 A1* 10/2015 Sieber ................ F03B 13/1875
417/331
2016/0208768 A1 7/2016 Allen et al.

* cited by examiner

COMPRESSOR FOR COMPRESSING HIGH-PRESSURED FLUIDS

BACKGROUND

1. Field

Embodiments described herein relate generally to a system for further pressurizing pressurized fluid using motion of a wave upon a surface of the body of water, and a method of operation thereof, and more particularly to compressor assembly having a compression piston having a first side and the second side and a piston rod comprising a first rod portion coupled to the first side and a second rod portion coupled to the second side.

2. Description of Related Art

Systems for generating energy from motion of waves on a body of water using multiple compression cylinders coupled in series as different stages are known. In such systems, each compression cylinder incrementally increases a pressure of a fluid within each compression cylinder by moving a piston of the compression cylinder using the upward and downward motion of the waves. Additionally, in such systems, an output fluid of a previous compression cylinder is an input fluid of a current compression cylinder, an output fluid of the current compression cylinder is an input fluid of a subsequent compression cylinder and so forth. However, a pressure of an input fluid into a compression cylinder of a particular stage (and particularly a late stage) may be high enough to exert a force on the piston and reduce the efficiency and compressive power of pre-existing compression cylinders. For example, during some later stages, the input fluid may be at a pressure of 1000 psi or more (or at 6.89 N/mm$^2$ or more).

SUMMARY

In one embodiment, there is provided a system for further pressurizing pressurized fluid using motion of waves upon a surface of a body of water, the pressurized fluid being pressurized by a previous compressor assembly. The system comprises a compressor assembly comprising: a compression chamber having a top end and a bottom end; a compression piston having a first side and a second side, wherein the compression piston is slidably housed within the compression chamber; and a piston rod comprising: a first rod portion having a first end coupled to a buoyant member floating on the surface of the body of water and a second end coupled to the first side of the compression piston, wherein movement of the buoyant member is transferred, via the first rod portion, into movement of the compression piston between the top end and the bottom end; and a second rod portion having a first end coupled to the second side of the compression piston and a second end including a terminal surface, wherein the second portion is sized such that the terminal surface is located within an equalizer assembly during an entire range of motion of the compression piston between the top end and the bottom end, and wherein a diameter of the second portion is equal to or greater than a diameter of the first portion.

In another embodiment, there is provided a method for further pressurizing pressurized fluid within a compressor assembly using motion of waves upon a surface of a body of water, the pressurized fluid being pressurized by a previous compressor assembly. The method comprises moving a compression piston of the compressor assembly away from a bottom end of a compression chamber and towards a top end of the compression chamber in response to a buoyant member floating on the surface rising due to an upward motion of the waves. A first side of the compression piston is coupled to the buoyant member via a first rod portion of a piston rod. A second side of the compression piston is coupled to a second rod portion of the piston rod, the second rod portion sized such that a terminal surface of the second rod portion is located within an equalizer assembly during an entire range of motion of the compression piston between the top end and the bottom end. A diameter of the second portion is equal to or greater than a diameter of the first portion. The method further comprises moving the compression piston away from the top end and towards the bottom end in response to the buoyant member falling due to a downward motion of the waves.

Other aspects and features of the present disclosure will become apparent to those ordinarily skilled in the art upon review of the following description of specific embodiments of the disclosure in conjunction with the accompanying figures.

BRIEF DESCRIPTION OF THE DRAWINGS

In drawings which illustrate embodiments.

DETAILED DESCRIPTION

Figure 1:
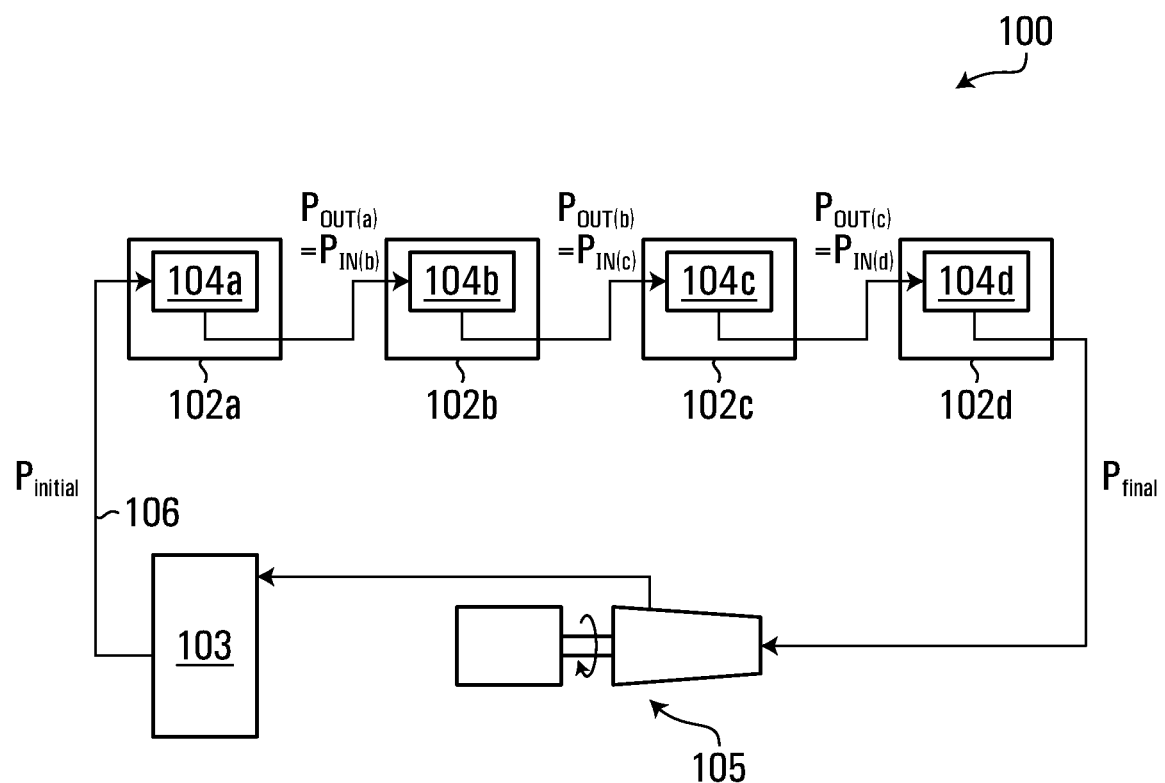
FIG. 1 is a schematic of a wave energy generation system according to one embodiment.

Referring to FIG. 1, a schematic of a wave energy generation system according to one embodiment is shown generally at 100. The system 100 is generally configured to convert movement, and particularly a vertical portion of the movement, caused by waves on a surface of a body of water 101 into useful energy (such as electrical energy for example).

In the embodiment shown, the system 100 comprises multiple pressurization stages 102 each in fluid communication with each other, a reservoir 103, and a generator 105. Each stage 102 includes a respective subsystem 104 connected to an adjacent subsystem 104 of an adjacent stage 102 via conduits 106. A compressible fluid 108 from the reservoir 103 is circulated through the different subsystems 104 in series via the conduits 106 such that the fluid 108 outputted by the subsystem 104 of a previous stage 102 is the fluid 108 inputted into the subsystem 104 of a current stage 102 and the fluid 108 outputted by the subsystem 104 of the current stage 102 is the fluid 108 inputted into the subsystem 104 of a subsequent stage 102. The fluid 108 is increasingly pressurized by each of the subsystems 104. For example, in the embodiment shown, the system 100 includes four stages 102a, 102b, 102c and 102d. The fluid 108 enters a first subsystem 104a of the first stage 102a at an initial input pressure $P_{initial}$ and is compressed by the first subsystem 104a to a first output pressure $P_{OUT(a)}$ as described in detail below. The fluid 108 at $P_{OUT(a)}$ is used as the input of a second subsystem 104b of the second stage 102b, such that a second input pressure $P_{IN(b)}$ of the fluid 108 into the second subsystem 104b equals the first output pressure $P_{OUT(a)}$ outputted by the first subsystem 104a. The fluid 108 at $P_{IN(b)}$ is pressurized by the second subsystem 104b to a second output pressure $P_{OUT(b)}$. The fluid 108 at $P_{OUT(b)}$ is used as the input of a third subsystem 104c of the third stage 102c, such that a third input pressure $P_{IN(c)}$ into the third subsystem 104c equals the second output pressure $P_{OUT(b)}$ outputted by the second subsystem 104b. The fluid 108 at $P_{IN(c)}$ is then compressed by the third subsystem 104c into a third output pressure $P_{OUT(c)}$. The fluid 108 at $P_{OUT(c)}$ is used as the input of a fourth subsystem 104d of the fourth stage 102d, such that a fourth input pressure $P_{IN(d)}$ into the fourth subsystem 104d equals the third output pressure $P_{OUT(c)}$ outputted by the third subsystem 104c. The fluid 108 at $P_{IN(d)}$ is then compressed by the fourth subsystem 104d into a final output pressure P final. In other embodiments and depending on geographical location of the system, the anticipated height of waves on the body of water 101 and the type of fluid, the system 100 may include fewer or additional stages, and may include between 2 and 100 stages for example.

The fluid 108 may comprise any compressible fluid 108, such as any compressible gas or liquid, although the specific mechanical structures of the system 100 may change depending on the characteristics of the fluid 108. In the embodiment shown, the fluid 108 comprises a gas, and specifically comprises an atmospheric gas mixture of at least 75% nitrogen and at least 20% oxygen.

The fluid 108 as pressurized by the stages 102a-102d to P final may then be used to drive the generator 105. The generator 105 may be any generator operable to convert the fluid 108 pressurized to P final into electrical power. For example, the generator 105 may comprise a hydraulic motor or a pneumatic motor, such as a vane motor, a gear motor, a piston motor, or a turbine for example. After powering the generator 105, the fluid 108 may return to the reservoir 103 and may be circulated from the reservoir 103 back through the different stages 102 again, such that the system 100 substantially comprises a closed loop system. In other embodiments (not shown), the fluid 108 may be inputted into the first subsystem 104a and exhausted after powering the generator 105 such that the system 100 comprises an open-loop system.

Figure 2:
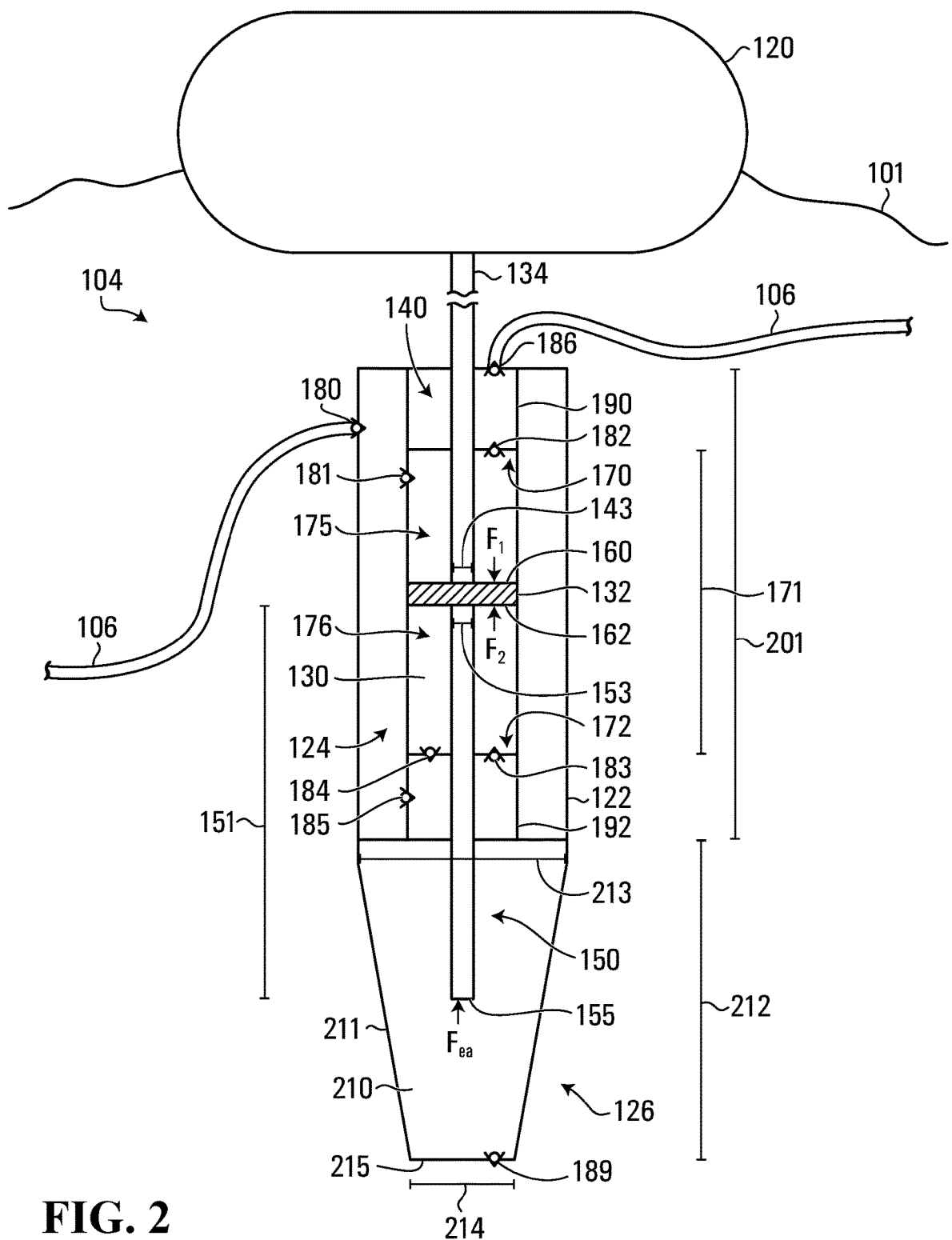
FIG. 2 is a side schematic of a subsystem of the wave energy generation system of FIG. 1 according to one embodiment.

Specific components of each subsystem 104 according to one embodiment is generally shown in FIG. 2. In the embodiment shown, each subsystem 104 includes a buoyant member 120, an accumulating manifold 122, a compressor assembly 124, an equalizer assembly 126, a high-pressure reservoir 190 and a low-pressure reservoir 192. In other embodiments, each subsystem 104 may include fewer or additional components. For example, in certain embodiments and/or for certain stages 102 within a particular system 100, the subsystem 104 may not include the high-pressure reservoir 190 and/or the low-pressure reservoir 192.

The buoyant member 120 is generally constructed and configured to float on a surface of the body of water 101 and to rise and fall with rise and fall of waves on the surface of the body of water 101. The vertical portion of this movement of the buoyant member 120 causes corresponding motion in the compressor assembly 124 to pressurize the fluid 108 as described below. In the embodiment shown, the buoyant member 120 comprises a hollow vessel lighter than water displaced by the buoyant member 120. The buoyant member 120 may be constructed of light-weight material such as styrofoam or plastic (such as vinyl or high-density polyethylene plastic for example). In other embodiments, the buoyant member 120 may further function as a reservoir vessel which stores the fluid 108 and may store the fluid 108 at $P_{OUT}$ outputted by a previous subsystem 104 before the fluid 108 is inputted into a current subsystem 104. For example, a second buoyant member 120b of the second subsystem 104b (of the second stage 102a) may store the fluid 108 at the first output pressure $P_{OUT(a)}$ as compressed by the first subsystem 104a (of the first stage 102a) before the fluid 108 is inputted into the second subsystem 104b. This storage of the fluid 108 may ensure that a sufficient volume of the fluid 108 is supplied to the second subsystem 104b for a compression stroke and an expansion stroke as described below.

The accumulating manifold 122 surrounds the compressor assembly 124 and is in fluid communication with both a compression chamber 130 of the compressor assembly 124 of a current subsystem 104 and the compression chamber 130 of the compressor assembly 124 of a previous subsystem 104. The accumulating manifold 122 collects the fluid 108 as compressed by the previous subsystem 104 and distributes it into the compression chamber 130 of the current subsystem 104. For example, a second accumulating manifold 122b of the second subsystem 104b receives the fluid 108 at the first output pressure $P_{OUT(a)}$ as compressed by the compressor assembly 124a of the first subsystem 104a and distributes this compressed fluid 108 to the compressor assembly 124b of the second subsystem 104b.

In the embodiment shown in FIG. 2, the accumulating manifold 122 includes at least one manifold inlet 180 which receives the fluid 108 from the previous subsystem 104. The manifold inlet 180 may comprise a one-way check valve calibrated to an output pressure of the previous subsystem 104. For example, a manifold inlet 180b of the second accumulating manifold 122b may have an opening pressure calibrated to the first output pressure $P_{OUT(a)}$ of the first subsystem 104a. In other embodiments, the manifold inlet 180 may comprise another type of a fluid valve, and may comprise a flow control valve or an electrically operated solenoid valve for example. In the embodiment shown, the accumulating manifold 122 has a single manifold inlet 180. In other embodiments, the accumulating manifold 122 may have more than one manifold inlet 180, such as anywhere between 1 and 12 manifold inlets for example. Increasing the number of manifold inlets may enable the use of smaller diameter conduits 106 to couple adjacent subsystems 104.

Figure 3:
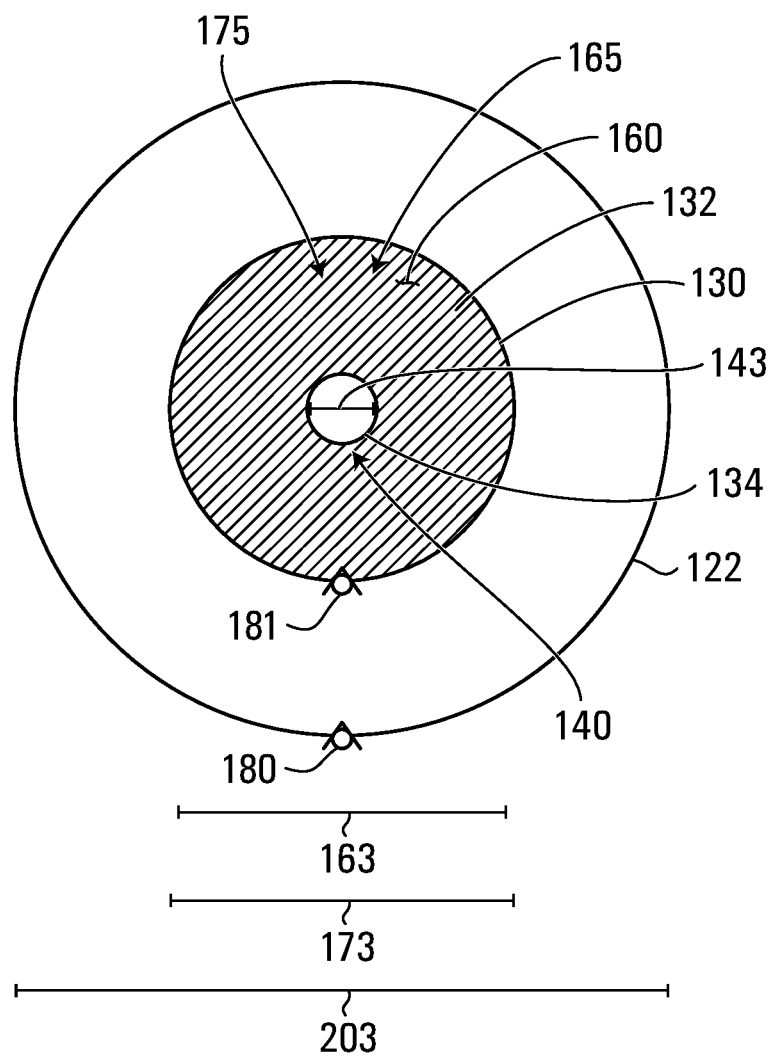
FIG. 3 is a top schematic of an accumulating manifold and a compressor assembly of the subsystem of FIG. 2.

In the embodiment shown, the accumulating manifold 122 has a cylindrical configuration surrounding the compression chamber 130, a length 201 greater than a length 171 of the compression chamber 130 and a diameter 203 greater than a diameter 173 of the compression chamber (shown in FIG. 3). In the embodiment shown, the length 201 is approximately 72 inches (or approximately 182.88 cm) and the diameter 203 is approximately 16 inches (or approximately 40.64 cm). In other embodiments and/or for certain stages 102 within a particular system 100, the length 201 may range between approximately 24 and 240 inches (or between approximately 60.96 and 609.6 cm) and the diameter 203 may range between approximately 10 and 120 inches (or between approximately 25.4 and 304.8 cm), both depending on the anticipated height of the waves on the body of water 101. In some embodiments, the length 201 of the accumulating manifold 122 may be at least 1.25 greater than the length 171 of the compression chamber 130 and the diameter 203 of the accumulating manifold 122 may be at least 1.5 greater than the diameter 173 of the compression chamber 130.

Still referring to FIGS. 2 and 3, the compressor assembly 124 comprises the compression chamber 130, a compression piston 132 slidably housed within the compression chamber 130 and a piston rod 134 coupling the compression piston 132 to the buoyant member 120.

The compression chamber 130 has a top end 170 and a bottom end 172. In the embodiment shown, the compression chamber 130 has a substantially cylindrical configuration, the length 171 extending between the top and bottom ends 170 and 172, and the diameter 173. In the embodiment shown, the length 171 is approximately 48 inches (or approximately 121.92 cm) and the diameter 173 is approximately 8 inches (or approximately 20.32 cm). In other embodiments and/or for certain stages 102 within a particular system 100, the length 171 may range between approximately 6 and 192 inches (or between approximately 15.24 and 487.68 cm), and the diameter 173 may range between approximately 6 and 96 inches (or between approximately 15.24 and 243.84 cm). The exact dimensions of the length 171 and the diameter 173 may be selected based on the anticipated input pressure $P_{IN}$ received within a particular subsystem 104, the desired output pressure $P_{OUT}$ generated by the subsystem 104, and the anticipated height of the waves on the body of water 101.

The compression piston 132 divides the compression chamber 130 into the variable volume high-pressure portion 175 proximate the top end 170 and a variable volume low-pressure portion 176 proximate the bottom end 172. The high and low-pressure portions 175 and 176 are not in fluid communication with each other (except for any fluid leakage at a sliding interface between the compression piston 132 and a sidewall defining the compression chamber 130), such that the compression piston 132 provides a substantially fluid-tight seal between the high-pressure portion 175 and the low-pressure portion 176. However, both the high and low-pressure portions 175 and 176 are directly or indirectly in communication with the accumulating manifold 122 as described below. The compression piston 132 is fixedly coupled to the buoyant member 120 via the piston rod 134, such that movement of the buoyant member 120 caused by the waves on the body of water 101 is transferred to corresponding movement of the compression piston 132 within the compression chamber 130. The volume of the high and low-pressure portions 175 and 176 depends on the position of the compression piston 132 within the compression chamber 130. In this respect, the volume of the high-pressure portion 175 increases as the compression piston 132 moves away from the top end 170 and decreases as the compression piston 132 moves toward the top end 170 while the volume of the low-pressure portion 176 decreases and increases correspondingly respectively.

In the embodiment shown in FIGS. 2 and 3, the compression chamber 130 has at least one high-pressure inlet 181 into, and at least one high-pressure outlet 182 out of, the high-pressure portion 175. The high-pressure inlet 181 receives the fluid 108 from the accumulating manifold 122 of the current subsystem 104 and to recharge the high-pressure portion 175 (such as during an expansion stroke of the compression piston 132 for example). The high-pressure inlet 181 may comprise a one-way check valve calibrated to an input pressure of the current subsystem 104. For example, a high-pressure inlet 181b of a second compression chamber 130b (of the second subsystem 104b) may have an opening pressure calibrated to the second input pressure $P_{IN(b)}$ of the second subsystem 104b. The high-pressure portion 175 may further draw the fluid 108 from the accumulating manifold 122 via the high-pressure inlet 181 with a vacuum generated by an increase in its volume during the expansion stroke. The high-pressure outlet 182 outputs the fluid 108 from the high-pressure portion 175 into the high-pressure reservoir 190 (such as during a compression stroke of the compression piston 132 for example). The high-pressure outlet 182 may comprise a one-way check valve calibrated to an output pressure of the current subsystem 104, such that the fluid 108 may remain within the high-pressure portion 175 until the output pressure at which point it is outputted into the high-pressure reservoir 190. For example, a high-pressure outlet 182b of the second compression chamber 130b may have an opening pressure calibrated to the second output pressure $P_{OUT(b)}$ of the second subsystem 104b. In other embodiments, the high-pressure inlet and outlet 181 and 182 may comprise other types of valves, such as flow control valves or electronically controlled solenoid valves for example. In the embodiment shown, only a single high-pressure inlet 181 and a single high-pressure outlet 182 is shown; in other embodiments, the compression chamber 130 may include more than one high-pressure inlet 181 and/or more than one high-pressure outlet 182 and may have anywhere between 1 and 12 high-pressure inlets and anywhere between 1 and 12 high-pressure outlets for example.

The compression chamber 130 also has at least one low-pressure inlet 183 into, and at least one low-pressure outlet 184 out of, the low-pressure portion 176. The low-pressure inlet 183 receives the fluid 108 from the low-pressure reservoir 192 to recharge the low-pressure portion 176 (such as during a compression stroke of the compression piston 132 for example). The low-pressure inlet 183 may comprise a one-way check valve calibrated to an input pressure of the current subsystem 104. For example, a low-pressure inlet 183b of the second compression chamber 130b may have an opening pressure calibrated to the second input pressure $P_{IN(b)}$ of the second subsystem 104b. The low-pressure portion 176 may further draw the fluid 108 from the low-pressure reservoir 192 via the low-pressure inlet 183 with a vacuum generated by an increase in its volume during the compression stroke. The low-pressure outlet 184 provides the opposite functionality to the low-pressure inlet 183 and may output the fluid 108 from the low-pressure portion 176 to recharge the low-pressure reservoir 192 (such as during the expansion stroke for example). The low-pressure outlet 184 may also comprise a one-way check valve also calibrated to the input pressure of the current subsystem 104. For example, a low-pressure outlet 184b of the second compression chamber 130b may have an opening pressure also calibrated to the second input pressure $P_{IN(b)}$ of the second subsystem 104b. The low-pressure portion 176 may also push the fluid 108 into the low-pressure reservoir 192 via the low-pressure outlet 184 by back pressure generated by a decrease in its volume during the expansion stroke. Additionally, as the low-pressure inlet and outlet 183 and 184 are calibrated to a same opening pressure, the fluid 108 within the low-pressure portion 176 and the low-pressure reservoir 192 tend towards equilibrium during operation of the compression piston 132, which may generally maintain the fluid 108 within the low-pressure portion 176 at a lower pressure compared to the high-pressure portion 175 due at least in part to the greater combined total volume of the low-pressure portion 176 and the low-pressure reservoir 192. In other embodiments, the low-pressure inlet and outlet 183 and 184 may comprise other types of fluid valves, such as a flow control valves or electronically controlled solenoid valves for example. In the embodiment shown, the low-pressure inlet and outlet 183 and 184 are separate valves; in other embodiments, the low-pressure inlet and outlet 183 and 184 may comprise a single combined two-way valve between the low-pressure portion 176 and the low-pressure reservoir 192, or may comprise a simple aperture such that there is no fluid control between the low-pressure portion 176 and the low-pressure reservoir 192. Additionally, in the embodiment shown, only a single low-pressure inlet 183 and a single low-pressure outlet 184 is shown; in other embodiments, the compression chamber 130 may include more than one low-pressure inlet 183 and/or more than one low-pressure outlet 184, and may have anywhere between 1 and 12 low-pressure inlets and anywhere between 1 and 12 low-pressure outlets for example.

Still referring to FIGS. 2 and 3, the compression piston 132 is slidably housed in the compression chamber 130 and divides the compression chamber 130 to the variable volume high-pressure portion 175 and the variable volume low-pressure portion 176. In the embodiment shown, the compression piston 132 has a substantially circular configuration and a diameter 163 dimensioned to fit within the diameter 173 of the compression chamber 130 and to provide a substantially fluid-tight seal between the high and low-pressure portions 175 and 176. The shape and configuration of the compression piston 132 generally corresponds to the shape and configuration of the compression chamber 130, such that if the compression chamber 130 has a cuboid configuration and a square/rectangular cross-section, the compression piston 132 would be have a corresponding substantially square/rectangular configuration. In the embodiment shown, the diameter 163 is approximately 7.95 inches (or approximately 20.19 cm); in other embodiments and/or for certain stages 102 within a particular system 100 where the diameter 173 of the compression chamber 130 ranges between approximately 6 and 96 inches (or between approximately 15.24 and 243.84 cm), the diameter 163 of the compression piston 132 may similarly range between approximately 5.95 and 95.95 inches (or between approximately 15.11 and 243.71 cm).

The compression piston 132 includes a first side 160 having a surface area 165 defining a bottom wall of the high-pressure portion 175 and a second side 162 having a surface area 166 (not shown) defining a top wall of the low-pressure portion 176. The compression piston 132 may also comprise a fluid-tight seal around its perimeter to provide the substantially fluid-tight seal between the high and low-pressure portions 175 and 176.

The piston rod 134 includes a first rod portion 140 and a second rod portion 150. In the embodiment shown, the first rod portion 140 has a first end fixedly coupled to the buoyant member 120 and a second end fixedly coupled to the first side 160 of the compression piston 132. The second rod portion 150 has a first end fixedly coupled to the second side 162 of the compression piston 132 and a second end having a terminal surface 155. The second rod portion 150 further has a length 151 dimensional to position the terminal surface 155 within the equalizer assembly 126 during an entire range of motion of the compression piston 132 between the top and bottom ends 170 and 172 of the compression chamber 130. In the embodiment shown, the first and second rod portions 140 and 150 are separate structures attached to a same centre position on the first side 160 and the second side 162 of the compression piston 132; in other embodiments (not shown), the first and second rod portions 140 and 150 may instead be an integral unit received within a through hole at the centre position of the compression piston 132.

Figure 4:
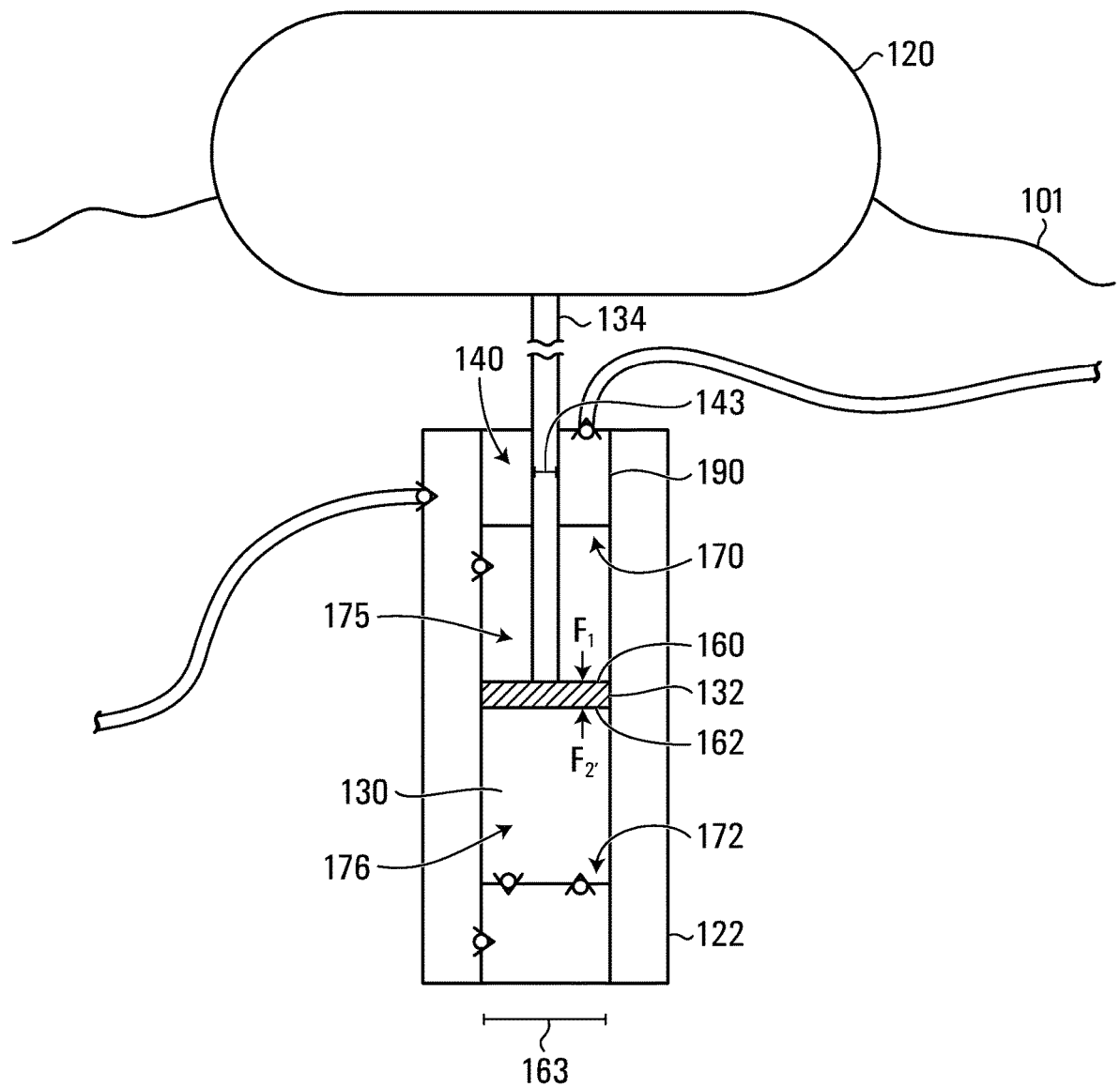
FIG. 4 is a side schematic of a subsystem of the wave energy generation system of FIG. 1 according to another embodiment.

The first rod portion 140 has a first diameter 143 and the second rod portion 150 has a second diameter 153. In the embodiment shown, the first and second diameters 143 and 153 are identical, and may both be approximately 1 inch (or approximately 2.54 cm), and the first and second rod portions 140 and 150 occupy an identical amount of surface area on the first and second sides 160 and 162 of the compression piston 132 and would reduce the exposed surface area 165 of the first side 160 and the exposed surface area 166 of the second side 162 by an equal amount. Referring briefly to FIG. 4, systems where a piston rod includes only the first rod portion 140 on the first side 160 of the compression piston 132 (or only includes the second rod portion 150 on the second side 162 of the compression piston 132 in some double-acting compressor assemblies or reversed acting compressor assemblies where the compression chamber itself is fixed to the buoyant member 120), the compression piston 132 may: (a) have unequal exposed surface areas on the first side 160 versus the second side 162, (b) experience unequal mass in the high-pressure portion 175 versus the low-pressure portion 176, and (c) experience unequal volume in the high-pressure portion 175 versus the low-pressure portion 176. These inequalities, particularly the unequal exposed surface area, may lead to inefficiencies and other reductions in the compressive power during the compression stroke of the compression piston 132.

For example, referring to FIGS. 2 and 4, the force $F_1$ on the first side 160 of the compression piston 132 may be calculated with the following equation:

$$F_1 = P_1(\pi(d_2^2 - d_1^2)/4) \qquad (1)$$

where:

$F_1$=force exerted on the first side 160 (lb, N)
$d_1$=the first diameter 143 of the first rod portion 140 (in, mm)
$d_2$=the diameter 163 of the compression piston 132 (in, mm)=
$P_1$=pressure exerted by the fluid 108 in the high-pressure portion 175 (psi, N/mm$^2$).

In the embodiment shown in FIG. 2, the force $F_2$ on the second side 162 of the compression piston 132 may be calculated with the identical equation:

$$F_2 = P_2(\pi(d_2^2 - d_3^2)/4) \quad (2)$$

where:
$F_2$=force exerted on the second side (lb, N)
$d_3$=the second diameter 153 of the second rod portion 150 (in, mm)
$d_2$=the diameter 163 of the compression piston 132 (in, mm)
$P_2$=pressure exerted by the fluid 108 in the low-pressure portion 176 (psi, N/mm2).

As can be seen from the equations (1) and (2) above, the amount of force exerted on the first and second sides 160 and 162 of the compression piston 132 depends on an exposed surface area of the first and second sides 160 and 162. Where the first diameter 143 of the first rod portion 140 and the second diameter 153 of second rod portion 150 are identical, the surface area of the first and second sides 160 and 162 would be reduced by a same amount and $F_1$ and $F_2$ would be identical when the fluid 108 within the high-pressure portion 175 and within the low-pressure portion 176 are at a same pressure.

However, in the embodiment shown in FIG. 4, where the piston rod 134 does not include the second rod portion 150, the force $F_{2'}$ produced on the second side 162 of the compression piston 132 having no rod portion may be calculated with the following equation:

$$F_{2'} = P_2(\pi(d_2^2)/4) \quad (3)$$

where
$F_{2'}$=force exerted on the second side (lb, N)
$d_2$=the diameter 163 of the compression piston 132 (in, mm)
$P_2$=pressure exerted by the fluid 108 in the low-pressure portion 176 (psi, N/mm$^2$).

As evident from equations (1) and (3) above, $F_{2'}$ on the second side 162 of the compression piston 132 without the piston rod 134 is greater than $F_1$ on the first side 160 of the compression piston 132 with the piston rod 134 when the fluid 108 within the high-pressure portion 175 and within the low-pressure portion 176 are at a same pressure, as the diameter of the piston rod 134 does not need to be accounted for on the second side 162. In embodiments and/or during certain stages 102 of a particular system 100 where the fluid 108 in the low-pressure portion 176 is at a relatively high-pressure (such as in the fourth stage 102*d* of the system 100 for example, where the fluid inputted into the low-pressure portion 176 has been compressed by a number of previous stages 102*a*, 102*b* and 102*c*), the difference of the diameter of the piston rod 134 and the difference in volume taken up by the piston rod 134 may produce significant differences in the $F_1$ on the second side 162 versus the $F_2$ on the first side 160, wherein the $F_2$ may exert a large baseline force urging the compression piston 132 away from the bottom end 172 and towards the top end 170 of the compression chamber 130, which may decrease the distance of movement of the compression piston 132 during a compression stroke and reduce the efficiency and compressive power of the compressor assembly 124.

Referring back to FIG. 2, to reduce any difference in $F_1$ on the first side 160 versus $F_2$ on the second side 162, both the first and second sides 160 and 162 may include the identical first and second rod portions 140 and 150 of the piston rod 134 having the identical first and second diameters 143 and 153. In other embodiments (not shown), the first and second diameters 143 and 153 may be different, and may specifically be different depending on the stage 102 of a particular system 100. For example, at earlier stages 102 (such as the first stage 102*a* for example) where the fluid 108 within the low-pressure portion 176 is at a relatively low pressure (such as at the initial input pressure initial $P_{initial}$), the piston rod 134 may comprise the first and second rod portions 140 and 150, but the first diameter 143 of the first rod portion 140 may be larger or equal to the second diameter 153 of the second rod portion 150. Alternatively, at these earlier stages 102, the piston rod 134 may only comprise the first rod portion 140 and not include the second rod portion 150 similar to the embodiment shown in FIG. 4. At intermediate stages 102 (such as the second stage 102*b* and third stage 102*c* for example) where the fluid 108 within the low-pressure portion 176 is at an intermediate pressure (such as the second input pressure $P_{IN(b)}$ or the third input pressure $P_{IN(c)}$ for example), the piston rod 134 may comprise the first and second rod portions 140 and 150, where the first diameter 143 of the first rod portion 140 is equal to the second diameter 153 of the second rod portion 150. At later stages 102 (such as the fourth stage 102*d* for example) where the fluid 108 within the low-pressure portion 176 is at a relatively high pressure (such as the fourth input pressure $P_{IN(d)}$ for example), the piston rod 134 may comprise the first and second rod portions 140 and 150, where the first diameter 143 of the first rod portion 140 may be smaller or equal to the second diameter 153 of the second rod portion 150, to further reduce or counteract any baseline upward force $F_2$ exerted on the second side 162 of the compression piston 132 by the fluid 108 within the low-pressure portion 176.

Additionally, to ensure that a negligible force is experienced by the terminal surface 155 of the second rod portion 150, the second rod portion 150 has the length 151 sufficient to position the terminal surface 155 within the equalizer assembly 126 and outside of the compression chamber 130 during the entire range of motion of the compression piston 132 between the top and bottom ends 170 and 172 of the compression chamber 130 (i.e. during the entire compression stroke and the entire expansion stroke). As described below, the equalizer assembly 126 may be maintained at a relatively low-pressure $P_{EA}$ of approximately 15 psi or less (or approximately 0.1 N/mm$^2$ or less), and which exerts a negligible force $F_{EA}$ on the terminal surface 155.

As described above, the high-pressure reservoir 190 receives the fluid 108 from the high-pressure portion 175 when the fluid 108 is compressed to an output pressure $P_{OUT}$ by the compressor assembly 124 of a current subsystem 104. The high-pressure reservoir 190 is also in fluid communication with the accumulating manifold 122 of a subsequent subsystem 104 to circulate the fluid 108 at $P_{OUT}$ to the manifold inlet 180 of the subsequent subsystem 104 via the output conduit 106. For example, a high-pressure reservoir 190*b* of the second subsystem 104*b* may be in fluid communication with, and may circulate the fluid 108 at the second output pressure $P_{OUT(b)}$ to, a third accumulating manifold 122*c* of the third subsystem 104*c*. In the embodiment shown in FIG. 2, the high-pressure reservoir 190 comprises a reservoir outlet 186 restricting the flow into the output conduit 106. The reservoir outlet 186 may comprise a one-way check valve calibrated to an output pressure of the current subsystem 104 or calibrated to a pressure slightly higher than the output pressure of the current subsystem 104 to allow the fluid 108 to maintain the output pressure within the output conduit 106. For example, a reservoir outlet 186*b* of a high-pressure reservoir 190*b* of the second subsystem 102b may be calibrated to the second output pressure $P_{OUT(b)}$ of the second subsystem 104b, or $P_{OUT(b)}+\Delta$. The fluid 108 compressed to the $P_{OUT}$ may remain within the high-pressure reservoir 190 until the fluid 108 reaches the calibrated pressure, at which point it is outputted by the reservoir outlet 186 into the output conduit 106. In other embodiments, the high-pressure reservoir 190 may not include the reservoir outlet 186 and there may be no fluid control between the high-pressure reservoir 190 may be in free communication with the output conduit 106. In such embodiments, the flow of the fluid 108 into the subsequent subsystem 104 may be restricted via the manifold inlet 180 of the accumulating manifold 122 of the subsequent subsystem 104.

As also described above, the low-pressure reservoir 192 receives the fluid 108 from, and recharges the fluid 108 into, the low-pressure portion 176 via the low-pressure inlet and outlet 183 and 184. Flow of the fluid 108 between the low-pressure reservoir 192 and the low-pressure portion 176 may depend on the expansion or the compression stroke of the compression piston 132, and the fluid 108 within the low-pressure reservoir 192 and the low-pressure portion 176 may generally tend towards equilibrium. The low-pressure reservoir 192 receives the fluid 108 at an input pressure of the current subsystem 104 from the accumulating manifold 122 of the current subsystem 104 via a reservoir inlet 185. The reservoir inlet 185 may comprise a one-way check valve calibrated to an input pressure the current subsystem 104. For example, a reservoir inlet 183b of a low-pressure reservoir 192b of the second subsystem 104b may have an opening pressure calibrated to the second input pressure $P_{IN(b)}$ of the second subsystem 104b. The low-pressure reservoir 192 generally allows the low-pressure inlet and outlet 183 and 184 to be placed on a flat surface of a wall of the low-pressure portion 176, rather than the curved sidewalls of the compression chamber 130, which may promote more efficient flow of the fluid 108 into and out of the low-pressure portion 176.

As noted briefly above, in certain embodiments and/or for certain stages 102 within a particular system 100, the subsystem 104 may not include the high-pressure reservoir 190 and/or the low-pressure reservoir 192. In embodiments not including the high-pressure reservoir 190, the fluid 108 compressed by the compressor assembly 124 of the current subsystem 104 to $P_{OUT}$ may flow directly from the high-pressure portion 175, through the high-pressure outlet 182, and into the output conduit 106 for receipt by the accumulating manifold 122 of the subsequent subsystem 104. In embodiments not including the low-pressure reservoir 192, the low-pressure inlet and outlet 183 and 184 of the compression chamber 130 may directly communicate with the accumulating manifold 122 of the current subsystem 104 and the fluid 108 within the low-pressure portion 176 may flow directly into the accumulating manifold 122 via the low-pressure outlet 184 (such as during the expansion stroke) and the fluid 108 within the accumulating manifold 122 may flow directly into the low-pressure portion 176 via the low-pressure inlet 183 (such as during the compression stroke).

In other embodiments and/or for certain stages 102 within a particular system 100, the fluid 108 at $P_{OUT}$ outputted by the compression chamber 130 via the high-pressure outlet 182 or outputted by the high-pressure reservoir 190 via the reservoir outlet 186 may flow into a reservoir vessel separate from the subsystem 104, such as a reservoir located within the buoyant member 120 of the subsequent subsystem 104 as described above. For example, the fluid 108 outputted by a compression chamber 130b of the second subsystem 104b at the second output pressure $P_{OUT(b)}$ may be received and stored in the buoyant member 120c of the third subsystem 104c.

As discussed above, the equalizer assembly 126 is configured to house the terminal surface 155 of the second rod portion 150 such that a negligible force $F_{EA}$ is exerted on the terminal surface 155. The force $F_{EA}$ is considered "negligible" when it is at least 10 times less than the force $F_2$ that would be exerted on the terminal surface 155 if it was within the compression chamber 130.

In the embodiment shown in FIG. 2, the equalizer assembly 126 comprises a rigid chamber 210. The rigid chamber 210 is defined by a rigid sidewall 211 and a bottom wall 215. The rigid sidewall 211 and the bottom wall 215 provide the rigid chamber 210 with a substantially constant volume. The rigid chamber 210 may be watertight. For example, the rigid sidewall 211 may be integral with the bottom wall 215 and both the sidewall 211 in the bottom wall 215 may be formed of a watertight metal or plastic material. In the embodiment shown, the rigid sidewall 211 is tapered and provides the rigid chamber 210 with a conical configuration, such that a diameter of the rigid chamber 210 decreases from a maximum diameter 213 to a minimum diameter 214. In the embodiment shown, the maximum diameter 213 of the rigid chamber 210 is substantially the same as the diameter 203 of the accumulating manifold 122 and may be approximately 16 inches (or approximately 40.64 cm) and the minimum diameter 214 of the rigid chamber 210 is substantially the same as the diameter 173 of the compression chamber 130 and may be approximately 8 inches (or approximately 20.32 cm). In other embodiments, the maximum and minimum diameters 213 and 214 may vary depending on the corresponding diameters 203 and 173 of the accumulating manifold 122 and the compression chamber 130. In yet other embodiments, the maximum diameter 213 and the minimum diameter 214 may be the same such that the rigid equalization chamber 210 has a cylindrical configuration. Additionally, in yet other embodiments, the maximum and minimum diameters 213 and 214 may be sized to closely house the second rod portion 150. For example, both the maximum and minimum diameters 213 and 214 may be slightly larger than the second diameter 153 of the second rod portion 150, and may be between approximately 0.1 and 10 inches (or between approximately 0.254 and 25.4 cm) larger than the second diameter 153.

The rigid chamber 210 has a length 212. In the embodiment shown, the length 212 is substantially equal to the length 171 of the compression chamber 130 and is approximately 48 inches (or approximately 121.92 cm); however, the length 212 may also range between approximately 6 and 192 inches (or between approximately 15.24 and 487.68 cm) depending on the length 171 of the compression chamber 130. This length 212 allows the terminal surface 155 to remain within the rigid chamber 210 during the entire range of motion of the compression piston 132 between the top and bottom ends 170 and 172 of the compression chamber 130 and also prevents the second rod portion 150 from contacting the bottom wall 215 during the entire range of motion of the compression piston 132.

The rigid chamber 210 may be constructed and configured to maintain the low equalizer pressure $P_{EA}$ to ensure that there is negligible force $F_{EA}$ on the terminal surface 155. In the embodiment shown in FIG. 2, the $P_{EA}$ may be maintained at approximately 15 psi or less (or approximately 0.1 N/mm² or less). The rigid chamber 210 may comprise at least one equalizer outlet 189 configured to exhaust fluids within the rigid chamber 210. The equalizer outlet 189 may comprise a one-way check valve calibrated to $P_{EA}$ such that when the fluid pressure within the rigid chamber 210 exceeds $P_{EA}$, the fluids (including both gas and liquid) are expelled by the equalizer outlet 189 to reduce pressure in the rigid chamber 210. For example, any fluid leakage into the flexible chamber 220 from the compression chamber 130 and the low-pressure reservoir 192 within the subsystem 104 during operation of the compressor assembly 124, or any fluid leakage from the body of water 101 outside of the subsystem 104, may increase the pressure within the flexible chamber 220 and such leaked fluids may be expelled by the equalizer outlet 189. In other embodiments, the equalizer outlet 189 may be electronically controlled.

Figure 5A:
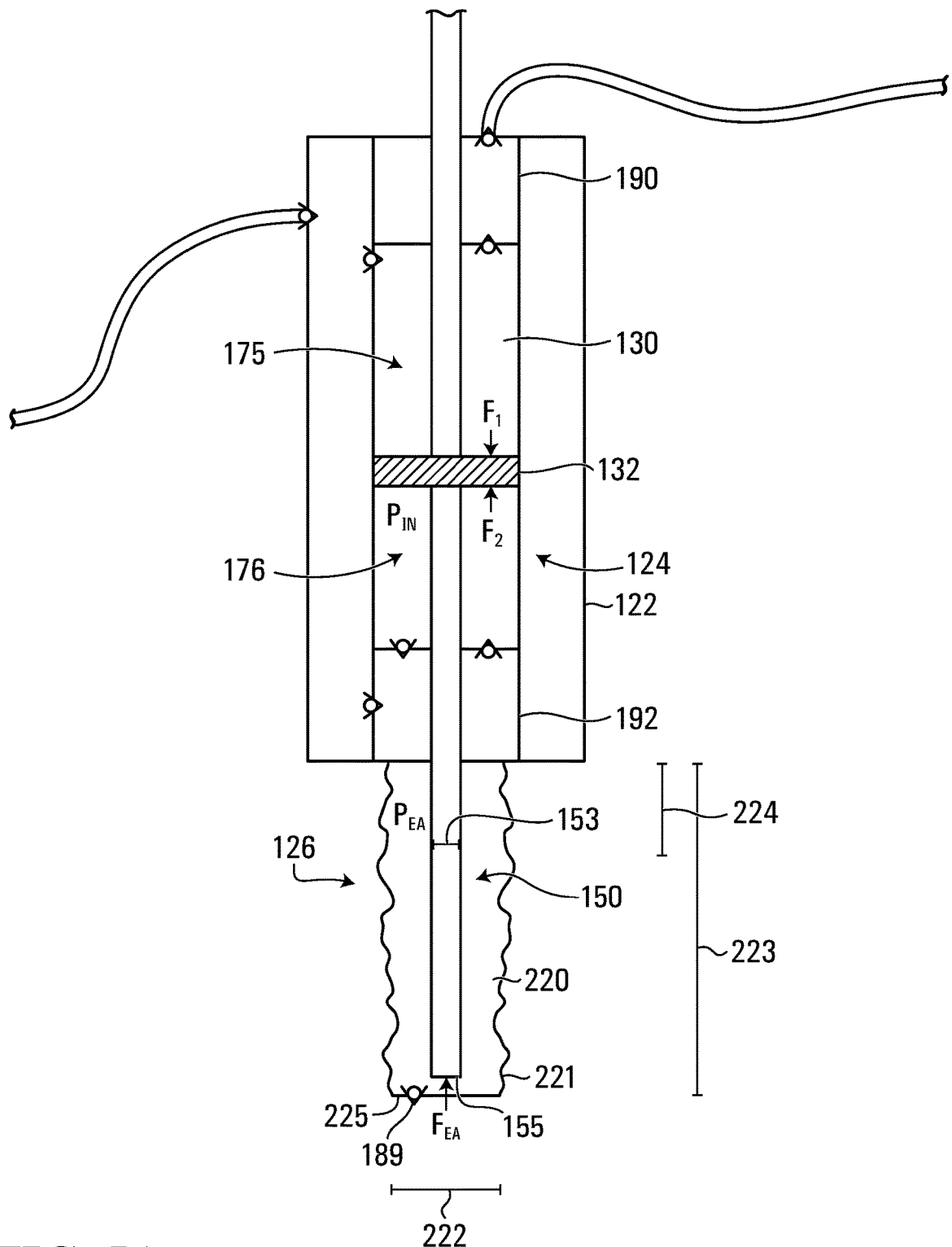
FIGS. 5A and 5B are side schematics of a subsystem of the wave generation system of FIG. 1 comprising an equalizer assembly according to another embodiment.

In the embodiment shown in FIG. 5A, the equalizer assembly 126 instead comprises a flexible chamber 220. The flexible chamber 220 is defined by a flexible sidewall 221 and a bottom wall 225. The flexible sidewall 221 may be formed of a deformable material, such as plastic, rubber, or metal-based foil for example. The bottom wall 225 may also be formed of a deformable material similar to the flexible sidewall 221, but may also be formed of a non-deformable material. The flexible chamber 220 may be substantially watertight. In this respect, the flexible sidewall 221 may be integral with the bottom wall 225, and both the flexible sidewall 221 and the bottom wall 225 may be formed of a watertight material, such as waterproof plastic, waterproof rubber or waterproof metal for example. In the embodiment shown, the flexible sidewall 221 provides the flexible chamber 220 with a substantially cylindrical configuration and an average diameter 222. In the embodiment shown, the average diameter 222 is sized to closely house the second rod portion 150 and is approximately 2 inches larger than the second diameter 153 of the second rod portion 150 (and is thus approximately 3 inches (or approximately 7.62 cm) in the embodiment shown). In other embodiments, the average diameter 222 may range between approximately 0.1 and 10 inches (or between approximately 0.25 and 25.4 cm) larger than the second diameter 153.

The flexible sidewall 221 allows the flexible chamber 220 to compress to a minimum length 224 during the compressive stroke of the compression piston 132 and expand to a maximum length 223 during the expansion stroke of the compression piston 132, and thus provide the flexible chamber 220 with a variable volume. In the embodiment shown, during the expansion stroke, the terminal surface 155 of the second rod portion 150 contacts the bottom wall 225 to expand the flexible chamber 220 towards the maximum length 223. To accommodate the entire extension stroke of the compression piston 132, the maximum length 223 may be equal to or greater than the length 171 of the compression chamber 130. During the compression stroke, pressure exerted by the surrounding body of water 101 on the bottom wall 225 may compress the flexible chamber 220 towards the minimum length 224 as the second rod portion 150 retracts from the flexible chamber 220 and back into the low-pressure reservoir 192 and the compression chamber 130. In other embodiments, the terminal surface 155 may be coupled to the bottom wall 225 or the flexible sidewall 221, such that the second rod portion 150 may push the bottom wall 225 or the flexible sidewall 221 to expand the flexible chamber 220 towards the maximum length 223 during the expansion stroke and pull the bottom wall 225 or the flexible sidewall 221 to retract the flexible chamber 220 towards the minimum length 224 during the compression stroke. The terminal surface 155 may be coupled to the bottom wall 225 or the flexible sidewall 221 using a variety of different binding techniques including using fasteners or adhesives, or via welding, etc.

Similar to the rigid chamber 210, the flexible chamber 220 may be constructed and configured to maintain the low equalizer pressure $P_{EA}$ to ensure that there is negligible force $F_{EA}$ on the terminal surface 155. In the embodiment shown in FIG. 5A, the $P_{EA}$ may be maintained at approximately 15 psi or less (or approximately 0.1 N/mm$^2$ or less). Similar to the rigid chamber 210, the flexible chamber 220 also comprises the at least one equalizer outlet 189 calibrated to $P_{EA}$ and configured to exhaust any fluids (including both gas and liquid) within the flexible chamber 220 to maintain the pressure within the flexible chamber 220 at $P_{EA}$. For example, when the volume of the flexible chamber 220 decreases (such as during the compression stroke), pressure within the flexible chamber 220 may correspondingly increase. Additionally, any fluid leakage into the flexible chamber 220 from the compression chamber 130 and the low-pressure reservoir 192 within the subsystem 104, or from the body of water 101 for example, may increase pressure within the flexible chamber 220.

Figure 5B:
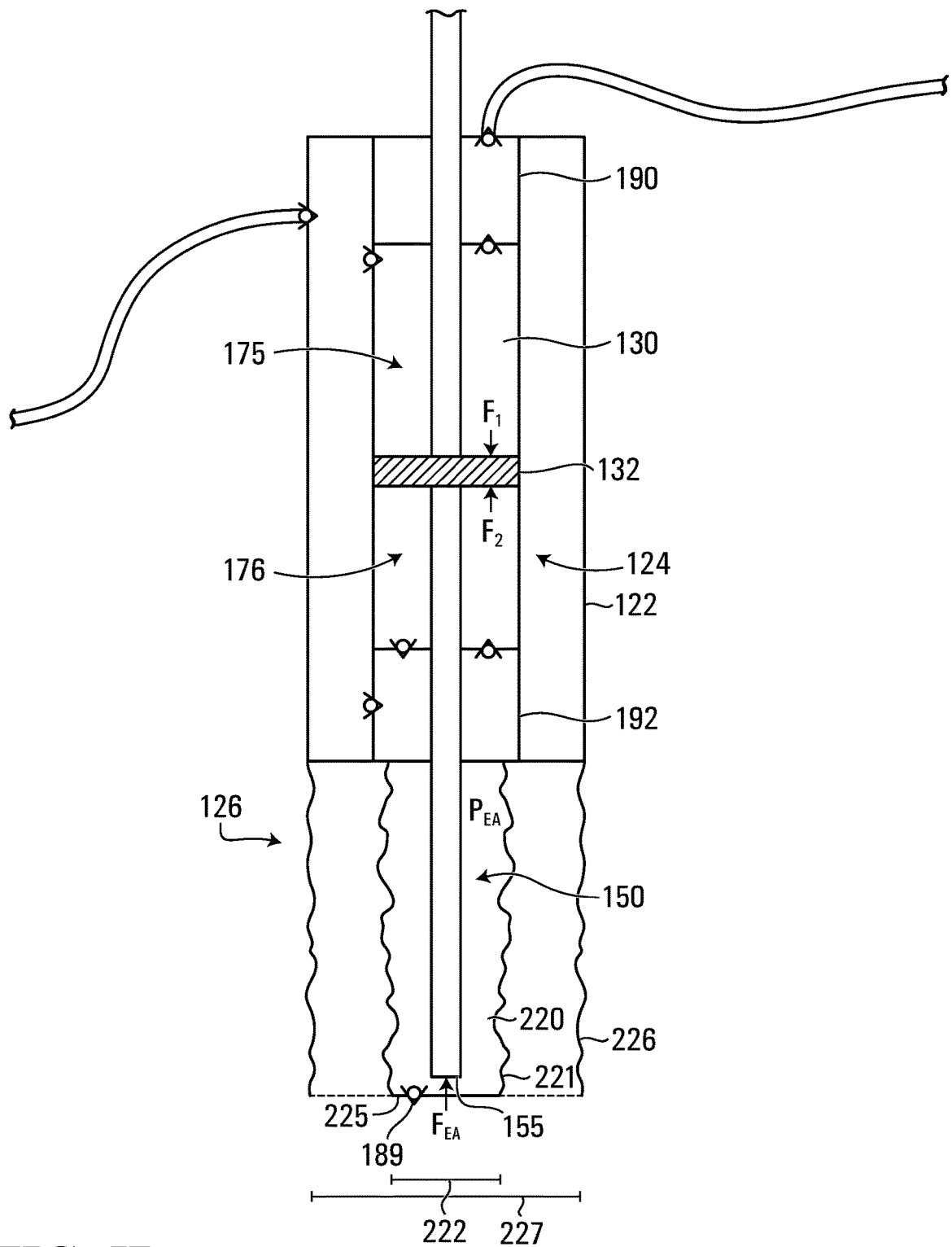

In the embodiment shown in FIG. 5B, the flexible chamber 220 may include the flexible sidewall 221 described above as an inner flexible sidewall, and further include a protective outer sidewall 226 surrounding the inner flexible sidewall 221. The outer sidewall 226 may have a diameter 227 larger than the average diameter 222 defined by the inner flexible sidewall 221. In some embodiments, the outer sidewall 226 may not be watertight, and may generally protect the inner flexible sidewall 221 from debris in the body of water 101. For example, the outer sidewall 226 may comprise a rigid metal cage. In other embodiments, the outer sidewall 226 may be watertight, and may serve as a layer which both aids in preventing water ingress into the inner flexible sidewall 221 while also protecting the inner flexible sidewall 221 from debris. For example, the outer sidewall 226 may be formed of non-water permeable material, and may be integral with an outer bottom wall (not shown). In some embodiments, the outer sidewall 226 may be rigid and may define a substantially constant volume. For example, the outer sidewall 226 may be formed of rigid and non-deformable metal for example. In other embodiments, the outer sidewall 226 may be deformable and may be coupled to the inner flexible sidewall 221 or the second rod portion 150 such that the outer sidewall 226 also expands with the flexible inner sidewall 221 during the expansion stroke of the compression piston 132 and compresses with the flexible inner sidewall 221 during the compression stroke of the compression piston 132. For example, the outer sidewall 226 may be formed of a plurality of baffles coupled to adjacent baffles at hinge joints, wherein the baffles move away from each other during the expansion stroke and move toward each other during the compression stroke. Alternatively, the outer sidewall 226 may be formed of a spring-based (slinky-like) collapsible and expandable cage.

Figure 6:
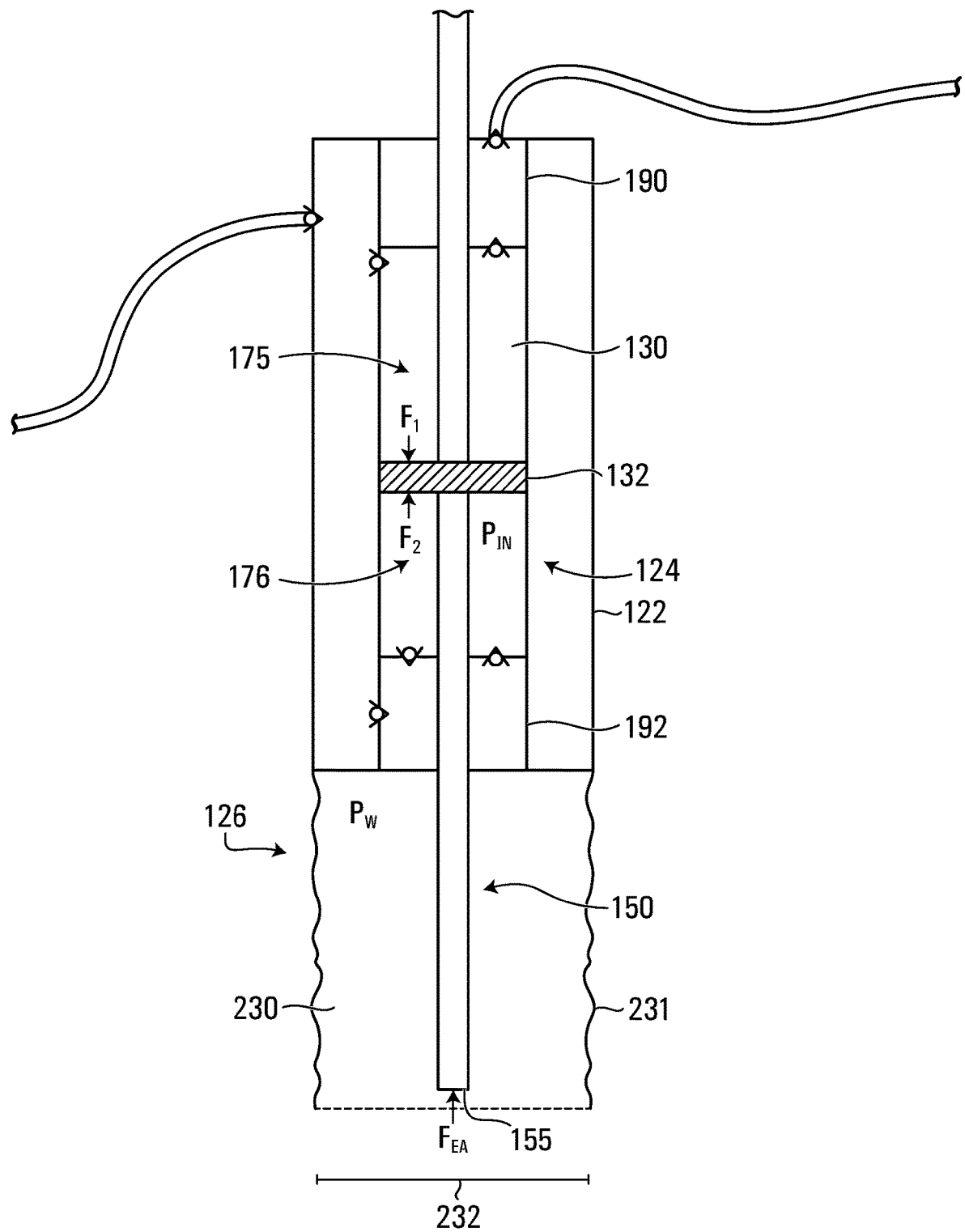
FIG. 6 is a side schematic of a subsystem of the wave generation system of FIG. 1 comprising an equalizer assembly according to another embodiment.

In the embodiment shown in FIG. 6, the equalizer assembly 126 comprises a non-watertight chamber 230, which may be useful in embodiments where the length 171 of the compression chamber 130 is sufficiently small that water pressure $P_W$ exerted by the body of water 101 does not exceed the $P_{IN}$ of the subsystem 104 within the low-pressure portion 176. For example, in the embodiment shown, where the length 171 of the compression chamber 130 is approximately 240 inches or less (or approximately 609.6 cm or less), the $P_W$ exerted by the body of water 101 would range between approximately 8.66 psi (or approximately 0.06

N/mm$^2$) during the compression stroke and approximately 17.32 psi (or approximately 0.12 N/mm$^2$) during the expansion stroke. With such ranges of P$_W$, the body of water 101 within the non-watertight chamber 230 may still exert the negligible force F$_{E4}$ on the terminal surface 155 that is still at least 10 times less than the force F$_2$ which would be exerted on the terminal surface 155 if it was within the low-pressure portion 176 of the compression chamber 130, particularly during later stages 102 of a particular system 100. For example, during later stages 102 of a particular system 100, P$_{IN}$ in the low-pressure portion 176 can approach or exceed approximately 1000 psi (or approximately 6.89 N/mm$^2$).

The non-watertight chamber 230 comprises a sidewall 231 and may be similar to the outer sidewall 226 of the flexible chamber 220 shown in FIG. 5B. In the embodiment shown, the sidewall 231 provides the non-watertight chamber 230 with a substantially cylindrical configuration and average diameter 232. In the embodiment shown, the average diameter 232 is sized to generally correspond to the diameter 203 (shown in FIG. 3) of the accumulating manifold 122, and may also be approximately 16 inches (or approximately 40.64 cm). In other embodiments, the average diameter 232 may be may instead be sized to closely house the second rod portion 150 and may be approximately 0.1 to 10 inches (or approximately 0.25 to 25.4 cm) larger than the second diameter 153 of the second rod portion 150. In some embodiments, the sidewall 231 may be rigid. For example, the sidewall 231 may comprise a rigid sidewall with an open bottom such as a solid cylinder with an open bottom, or a rigid permeable sidewall coupled to a permeable bottom wall such as a cage. In other embodiments, the sidewall 231 may be deformable and may be coupled to the second rod portion 150 such that the sidewall 231 expands during the expansion stroke of the compression piston 132 and compresses during the compression stroke of the compression piston 132. For example, similar to the outer side wall 226 of the flexible chamber 220 shown in FIG. 5B, the sidewall 231 may also be formed of a plurality of baffles coupled to adjacent baffles at hinge joints, or a spring-based (slinky-like) collapsible and expandable cage for example. The second rod portion 150 may be coupled to the sidewall 231 using a variety of different binding techniques including fasteners, adhesives, welding, etc.

Figure 7A:
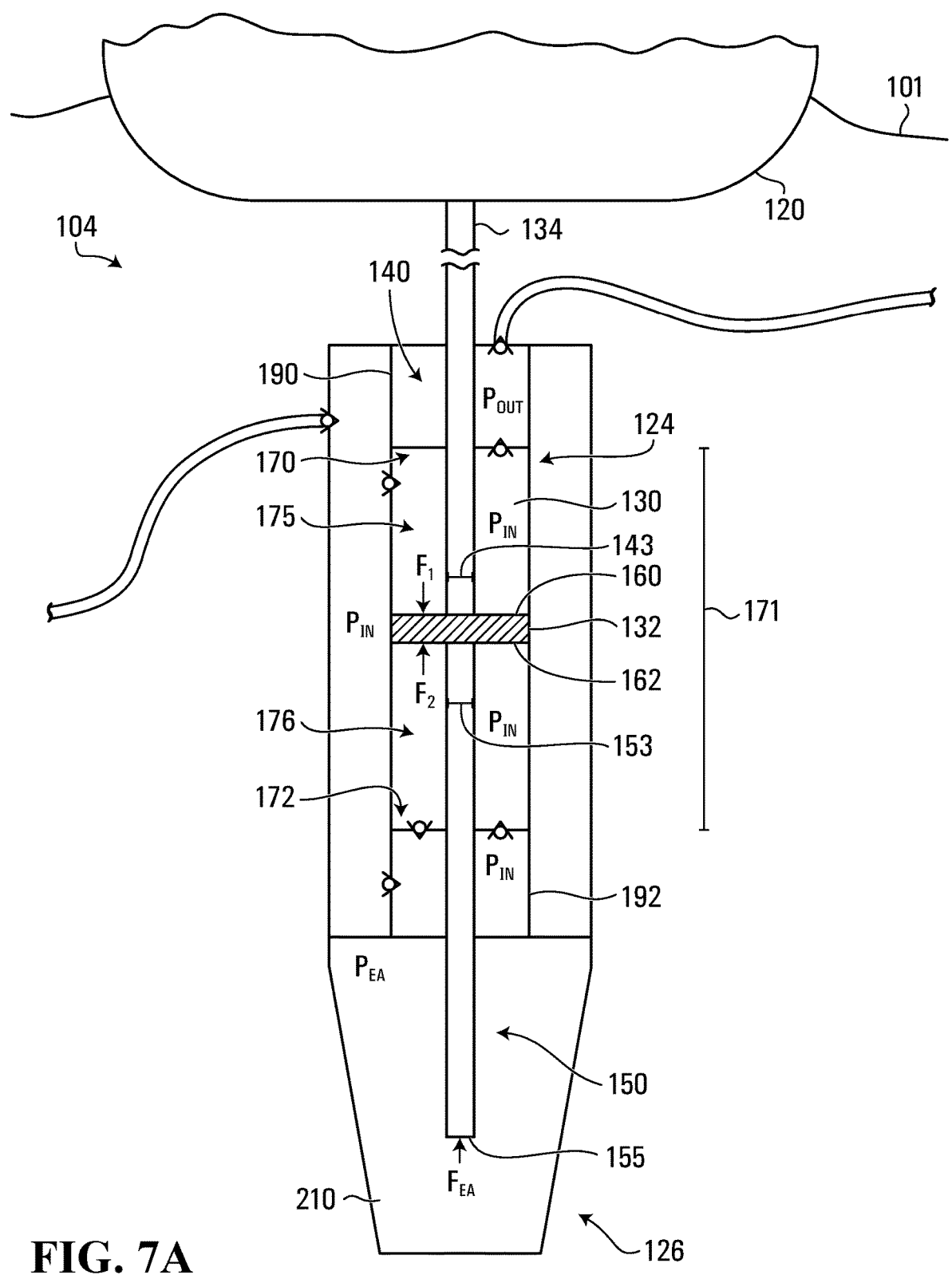
FIGS. 7A to 7C are side schematics of the subsystem of FIG. 2 with the compressor assembly at the equilibrium state, in a compression stroke and in an expansion stroke according to one embodiment.
Figure 7B:
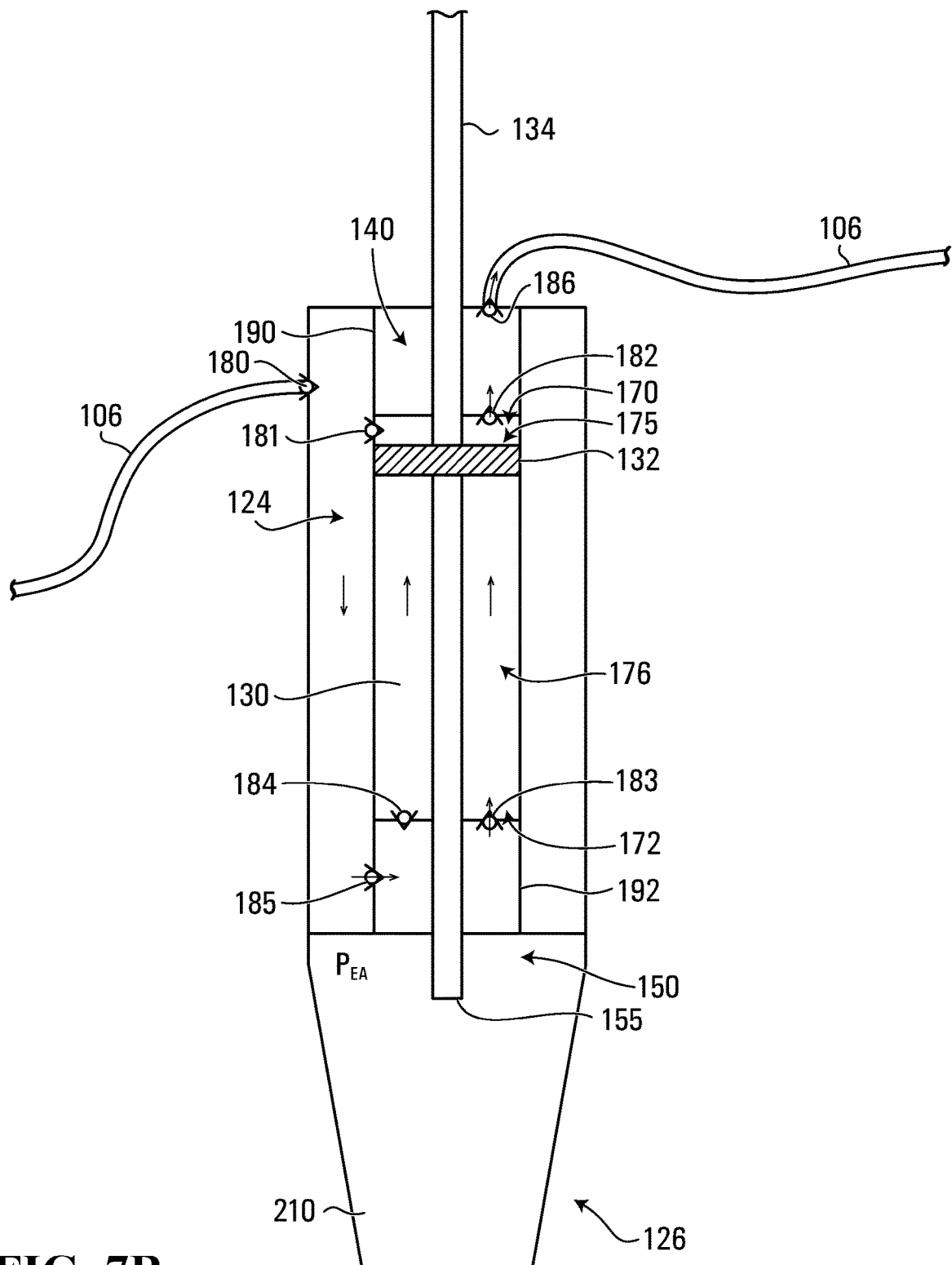
Figure 7C:
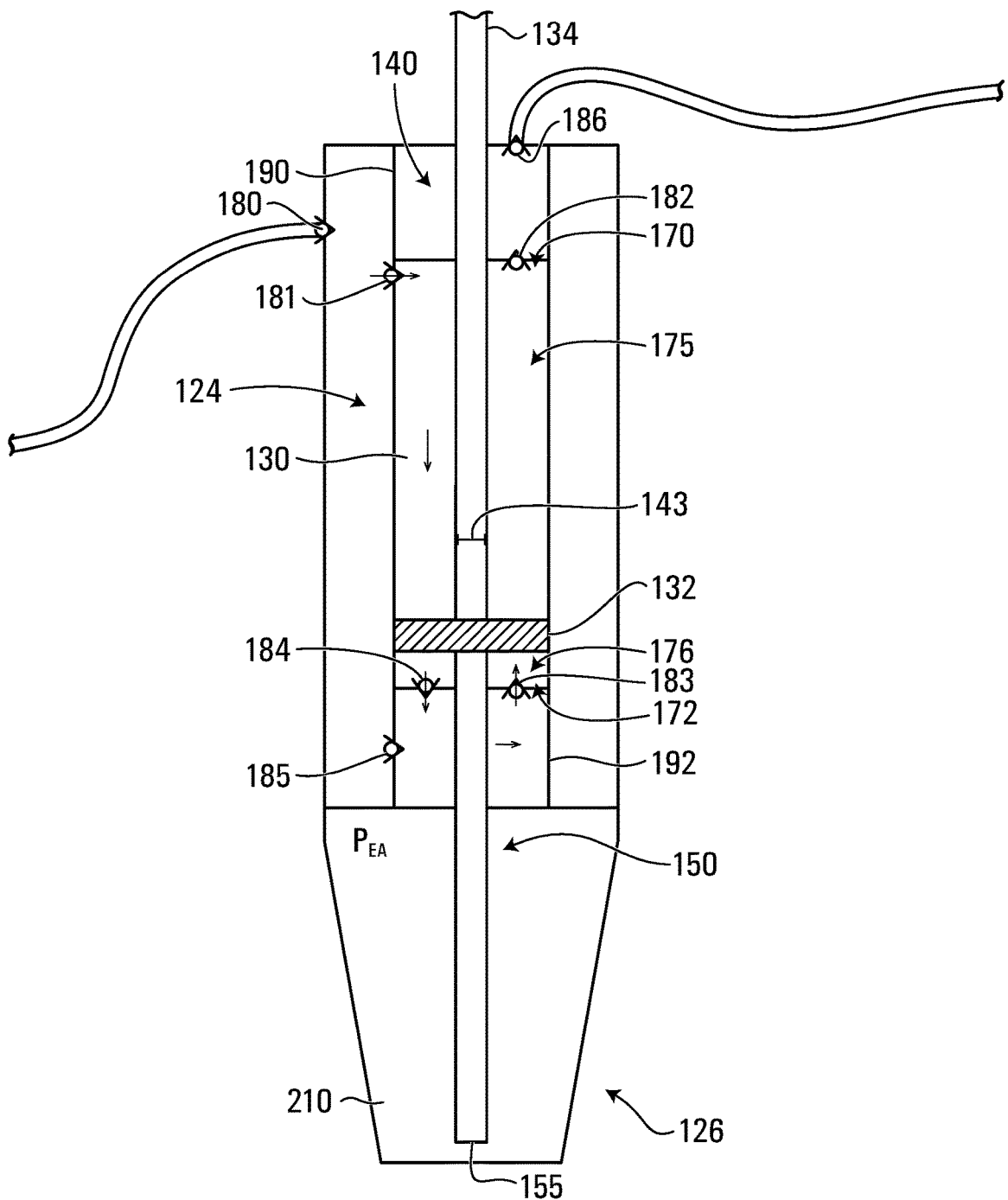

Referring now to FIGS. 7A-7C, the operation of a particular subsystem 104 will be explained. Referring to FIG. 7A, when the buoyant member 120 is floating on the surface of the body of water 101 at an equilibrium state, the compression piston 132 is positioned near a centre of the length 171 of the compression chamber 130. The fluid 108 in the high-pressure portion 175, the low-pressure reservoir 192 and the low-pressure portion 176 may all be at or around an input pressure P$_{IN}$ of the subsystem 104, while the fluid 108 in the high-pressure reservoir 190 may be at or around an output pressure P$_{OUT}$ of the subsystem 104 as compressed during a previous compression stroke. The terminal surface 155 of the second rod portion 150 is positioned within the equalizer assembly 126 when the compression piston 132 is in the equilibrium state.

Referring now to FIG. 7B, when the buoyant member 120 rises during a peak of an approaching wave on the body of water 101, the compression piston 132 is moved towards the top end 170 of the compression chamber 130 by the upward vertical portion of the movement of the buoyant member 120 and enters the compression stroke. During this compression stroke, the fluid 108 within the high-pressure portion 175 is compressed from P$_{IN}$ towards P$_{OUT}$ by the compression piston 132. When the fluid within the high-pressure portion 175 approaches, reaches or exceeds the calibrated output pressure P$_{OUT}$ of the subsystem 104, the high-pressure outlet 182 may open and the fluid 108 within the high-pressure portion 175 may flow into the high-pressure reservoir 190 and then into the accumulating manifold 122 of the subsequent stage 102 via the output conduit 106. At the same time, during this compression stroke, the fluid 108 within the low-pressure portion 176 decreases from P$_{IN}$ as the volume of the low-pressure portion 176 increases, which draws the fluid 108 within the low-pressure reservoir 192 into the low-pressure portion 176 in via the low-pressure inlet 183. As a result, the fluid 108 within the low-pressure reservoir 192 also decreases from P$_{IN}$, which in turn draws the fluid 108 within the accumulating manifold 122 into the low-pressure reservoir 192. This may generally maintain pressure equilibrium between the fluid 108 in the accumulating manifold 122, the low-pressure reservoir 192 and the low-pressure portion 176 at or around P$_{IN}$ during the compression stroke. Again, the terminal surface 155 of the second rod portion 150 remains within the equalizer assembly 126 during the compression stroke of the compression piston 132.

Referring now to FIG. 7C, when the buoyant member 120 subsequently falls during a trough of a wave on the body of water 101, the compression piston 132 is moved from the top end 170 to the bottom end 172 of the compression chamber 130 by the downward vertical portion of the movement of the buoyant member 120 and enters the expansion stroke. During this expansion stroke, the fluid 108 within the high-pressure portion 175 may continue to flow into the high-pressure reservoir 190 via the high-pressure outlet 182 until the fluid 108 decreases to less than the calibrated output pressure P$_{OUT}$. The pressure of the fluid 108 within the high-pressure portion 175 may further decrease as the volume of the high-pressure portion 175 increases, and may decrease to P$_{IN}$ or to less than P$_{IN}$, which may draw the fluid 108 within the accumulating manifold 122 into the high-pressure portion 175 via the high-pressure inlet 181 to recharge the high-pressure portion 175 with the fluid 108 at P$_{IN}$. Additionally, also during this expansion stroke, the fluid 108 within the low-pressure portion 176 may increase to greater than P$_{IN}$ as the volume of the low-pressure portion 176 decreases, which may force the fluid 108 within the low-pressure portion 176 into the low-pressure reservoir 192 via the low-pressure outlet 184. The subsequent increase in pressure of the fluid 108 in the low-pressure reservoir 192 may also force the fluid 108 back into the low-pressure portion 176 via the low pressure inlet 183. This generally maintains equilibrium between the fluid 108 within the low-pressure portion 176 and the low-pressure reservoir 192 during the expansion stroke. Again, the terminal surface 155 of the second rod portion 150 is remains within the equalizer assembly 126 during the expansion stroke of the compression piston 132.

As described above, during each of the equilibrium state, the compression stroke, and the expansion stroke, the fluid 108 injected into the high and low-pressure portions 175 and 176 of the compression chamber 130 of a subsystem 104 is at an input pressure P$_{IN}$ of that subsystem 104. The fluid 108 at P$_{IN}$ within the high-pressure portion 175 exerts a baseline downward force F$_1$ on the first side 160 of the compression piston 132 towards the bottom end 172 of the compression chamber 130, while the fluid 108 at P$_{IN}$ within the low-pressure portion 176 exerts a baseline upward force F$_2$ on the second side 162 of the compression piston 132 toward the top end 170 of the compression chamber 130 (best shown in FIG. 7A). As also described above, the input pressure $P_{IN}$ of the fluid 108 of a current subsystem 104 corresponds to the output pressure $P_{OUT}$ generated by a previous subsystem 104 of a previous stage 102. For example, the input pressure of the second subsystem 104b (of a second stage 102b) is the first output pressure $P_{OUT(a)}$ of the first subsystem 104a (of the first stage 102a). As such, the fluid 108 within the high and low-pressure portions 175 and 176 is always pressurized after the first stage 102a, and may become significantly pressurized after later stages 102 (such as the third stage 102c or the fourth stage 102d for example). At these later stages 102, the fluid 108 within the high and low-pressure portions 175 and 176 may be at an input pressure $P_{IN}$ sufficient to counteract a mass of the compression piston 132, a mass of the associated piston rod 134 and a mass of the buoyant member 120 such that during the expansion stroke, the fluid 108 within the low-pressure portion 176 is at a pressure sufficient to urge the compression piston 132 towards the top end 170 of the compression chamber 130 and prevent the compression piston 132 from reaching the bottom end 172. This may decrease the distance of movement of the compression piston 132 during a compression stroke and reduce the efficiency and compressive power of the compressor assembly 124 during compression strokes. This decrease in efficiency and compressive power may be exacerbated in systems where the piston rod 134 includes only the first rod portion 140 on the first side 160 of the compression piston 132 and does not include the second rod portion 150 on the second side 162 of the compression piston 132 (see FIG. 4 for example). However, this decrease in efficiency and compressive power maybe less pronounced in the current subsystem 104 where the piston rod 134 includes both the first rod portion 140 and the second rod portion 150, where the first and second rod portions 140 and 150 have the identical first and second diameters 143 and 153. The first and second diameters 143 and 153 of the first and second rod portions 140 and 150 reduce the exposed surface areas 165 and 166 of the first and second sides 160 and 162 equally such that there is no additional force exerted on the second side 162 due to the surface area 166 of the second side 162 being greater than the surface area 165 of the first side 160. Additionally, the terminal surface 155 of the second rod portion 150 of the piston rod 134 is located within the equalizer assembly 126 during the entire compression and the entire expansion strokes, and as such there is negligible force $F_{EA}$ exerted on the exposed terminal surface 155.

In certain embodiments, this decrease in efficiency and compressive power may be further counteracted by incorporating a piston rod 134 comprising both the first rod portion 140 and the second rod portion 150, but where the first diameter 143 of the first rod portion 140 is smaller than the second diameter 153 of the second rod portion 150. In such embodiments, the exposed surface area 165 of the first side 160 of the compression piston 132 is larger than the exposed surface area 166 of the second side 162 of the compression piston 132. Utilizing a second rod portion 150 having a larger second diameter 153 may generally reduce the upward force $F_2$ exerted on the second side 162 and may specifically reduce the upward force $F_2$ to lower than a downward force $F_1$ exerted on the first side 160.

Figure 8:
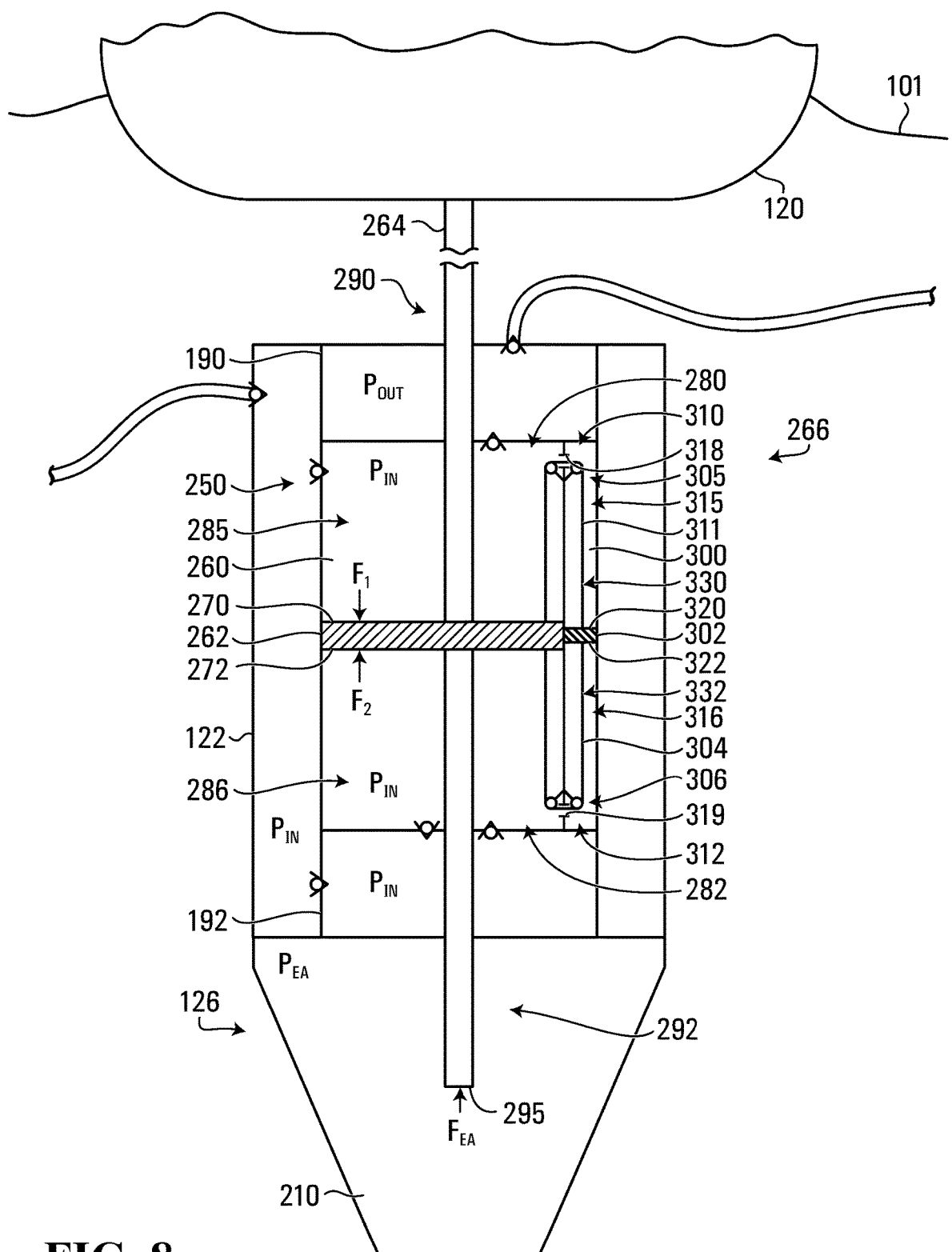
FIG. 8 is a side schematic of a subsystem of the wave energy generation system of FIG. 1 according to another embodiment.
Figure 9:
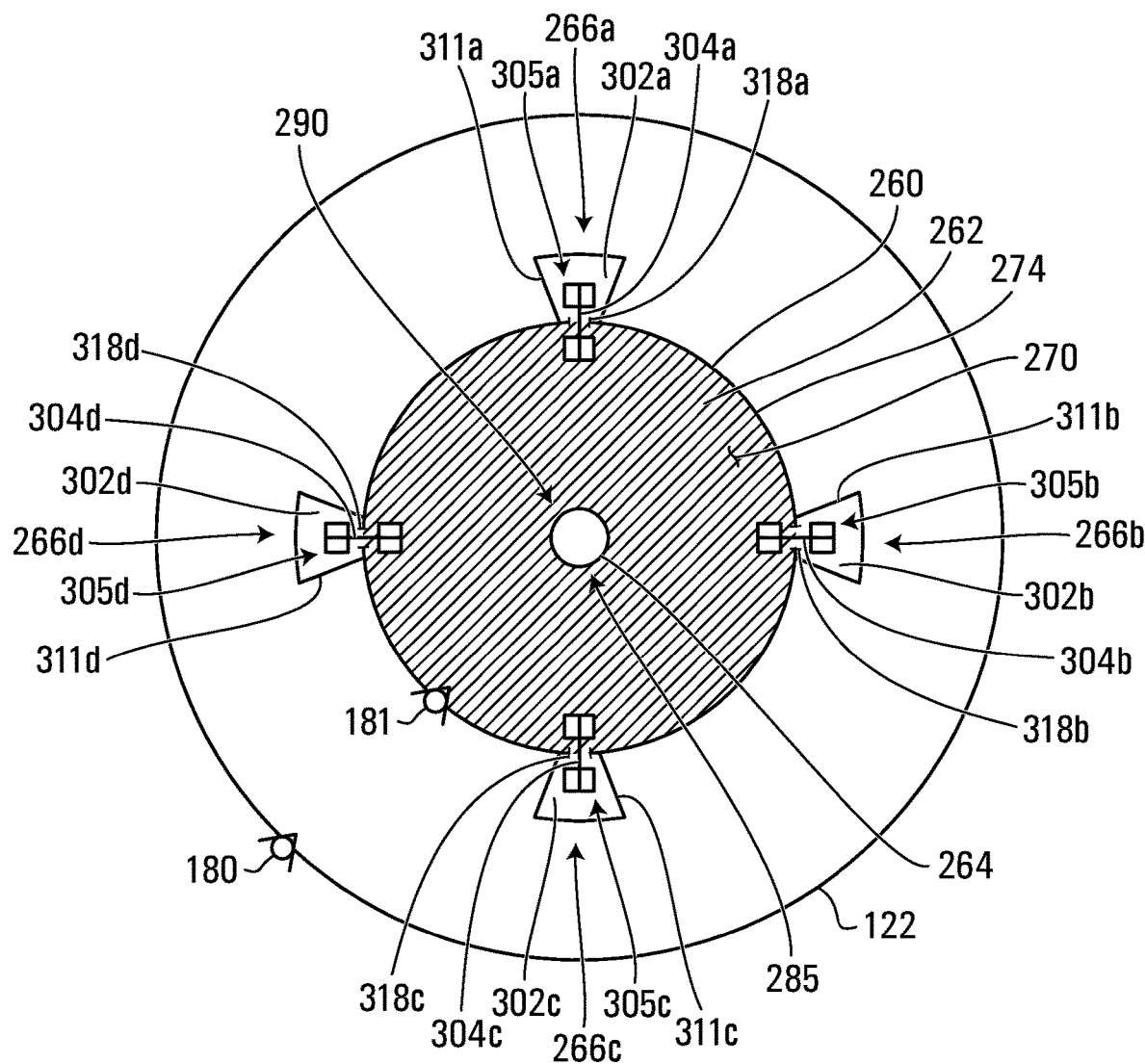
FIG. 9 is a top schematic of an accumulating manifold, a compressor assembly, and a plurality of booster systems of the subsystem of FIG. 8.

Referring now to FIGS. 8 and 9, another embodiment of a compressor assembly which may be used within one or more of the subsystems 104 of the system 100 is shown generally at 250. Similar to the compressor assembly 124 as described previously, the compressor assembly 250 also includes a compression chamber 260, a compression piston 262 and a piston rod 264.

The compression chamber 260 includes a top end 280 and a bottom end 282. The compression piston 262 is slidably housed within the compression chamber 260 and operable to move between the top and bottom ends 280 and 282. The compression piston 262 divides the compression chamber 260 into a variable volume high-pressure portion 285 and a variable volume low-pressure portion 286, wherein the volume of the high and low-pressure portions 285 and 286 depends on the position of the compression piston 262 within the compression chamber 260. The compression piston 262 includes a first side 270 and a second side 272, and generally defines a perimeter 274 (shown in FIG. 9). In the embodiment shown, the compression piston 262 has a substantially circular configuration, and thus the perimeter 274 comprises a circumference. However, similar to the compression piston 132 described above, the shape of the compression piston 262 may vary depending on the cross-sectional shape of the compression chamber 260.

The piston rod 264 includes a first rod portion 290 and a second rod portion 292. The first rod portion 290 has a first end coupled to the buoyant member 120 and a second end coupled to the first side 270 of the compression piston 262. The second rod portion 292 has a first end coupled to the second side 272 of the compression piston 262 and a second end with a terminal surface 295. The second rod portion 292 has a length sized such that the terminal surface 295 remains within the equalizer assembly 126 during an entire range of motion of the compression piston 262 between the top and bottom ends 280 and 282 of the compression chamber 260. In the embodiment shown, a diameter of the first rod portion 290 and the second rod portion 292 are identical; however, similar to the first and second rod portions 140 and 150 of the piston rod 134 (shown in FIG. 2) described above, in other embodiments and/or in certain stages 102 of a particular system 100, the diameters of the first and second rod portions 290 and 292 may be different. The coupling of the compression piston 262 to the buoyant member 120 (via the first rod portion 290) transfers the movement of the buoyant member 120 caused by the waves of the body of water 101 into corresponding movement of the compression piston 262 within the compression chamber 260 from the bottom end 282 to the top end 280 during a compression stroke of the compression piston 262 and from the top end 280 to the bottom end 282 during an expansion stroke of compression piston 262.

The compressor assembly 250 further includes a plurality of booster systems 266 coupled to the compression piston 262. The booster systems 266 are configured to further counteract any decrease in the efficiency and compressive power of the compressor assembly 250 when the compressor assembly 250 receives the fluid 108 at a relatively high input pressure $P_{IN}$. For example, during certain later stages 102 of a particular system 100, the initial $P_{IN}$ into the stage may be high enough to account for a mass of the compression piston 262, a mass of the piston rod 264 and the mass of the buoyant member 120 such that during the expansion stroke of the compression piston 262, the fluid 108 within the low-pressure portion 286 (alone or combined with the fluid 108 within the low-pressure reservoir 192) urges the compression piston 262 toward the top end 280, and/or prevents the compression piston 262 from reaching the bottom end 282. Referring to FIG. 9, in the embodiment shown, the plurality of booster systems 266 includes four booster systems 266 including a first booster system 266a located at the 12 o'clock position around the circumference 274, a second booster system 266b located at the 3 o'clock position, a third booster system 266c located at the 6 o'clock position and a fourth booster system 266d located at the 9 o'clock position; in other embodiments, the compressor assembly 250 may include fewer or more booster systems 266, and may include anywhere between 2 and 24 booster systems equidistantly distributed around the circumference 274 of the compression piston 262.

Still referring to FIGS. 8 and 9, in the embodiment shown, the booster system 266 includes a booster chamber 300, a booster piston 302, booster cable 304, a top pulley system 305 and a bottom pulley system 306.

The booster chamber 300 is defined by booster chamber walls 311 (such as booster chamber walls 313a, 313b, 311c and 311d shown in FIG. 9). The booster chamber 300 also has a top end 310 located generally proximate the top end 280 of the compression chamber 260 and a bottom end 312 located generally proximate the bottom end 282 of the compression chamber 260. In the embodiment shown, each booster chamber 300 has a curved polygon cuboid configuration, and a curved polygon cross-section, generally corresponding to a section of a ring around the compression chamber 260 (best seen in FIG. 9). However, in other embodiments, the booster chamber 300 may have a different configuration or a different cross-section and may comprise a cylinder having a circular cross-section instead for example. The booster chamber 300 houses the booster piston 302 which separates the booster chamber 300 into a variable volume first booster portion 315 and a variable volume second booster portion 316, wherein the volume of the first and second booster portions 316 and 315 depends on the position of the booster piston 302 within the booster chamber 300. The first and second booster portions 315 and 316 are not in fluid communication with each other (except for any fluid leakage through a sliding interface between the booster piston 302 and the booster chamber wall 311), such that the booster piston 302 provides a substantially fluid-tight seal between the first booster portion 315 and the second booster portions 316.

The first booster portion 315 is in fluid communication with the high-pressure portion 285 of the compression chamber 260 via at least one first portion valve 318. The first portion valve 318 may comprise a two-way valve having an enter pressure (from the high-pressure portion 285 into the first booster portion 315) calibrated to the output pressure $P_{OUT}$ of the current subsystem 104 and an exit pressure (from the first booster portion 315 into the high-pressure portion 285) also calibrated to the output pressure $P_{OUT}$, such that the fluid 108 tends towards equilibrium between the high-pressure portion 285 and the first booster portion 315. In other embodiments, the first portion valve 318 may comprise a simple aperture in the booster chamber wall 311 such that there is no fluid control between the high-pressure portion 285 and the first booster portion 315. Similarly, the second booster portion 316 is in fluid communication with the low-pressure portion 286 of the compression chamber 260 via at least one second portion valve 319. Similar to the first portion valve 318, the second portion valve 319 may comprise a two-way valve having an enter pressure (from the low-pressure portion 286 into the second booster portion 316) calibrated to the input pressure $P_{IN}$ of the current subsystem 104 and an exit pressure (from the second booster portion 316 back into the low-pressure portion 286) also calibrated to $P_{IN}$, such that the fluid 108 tends towards equilibrium between the low-pressure portion 286 and the second booster portion of 316. In other embodiments, the second portion valve 319 may comprise a simple aperture in the booster chamber wall 311 such that there is no fluid control between the low-pressure portion 286 and the second booster portion 316. In other embodiments, at least one of the first and second portion valves 318 and 319 may comprise other types of fluid valves, such as flow control valves or electronically controlled solenoid valves for example. Additionally, in the embodiment shown, the first portion valve 318 and the second portion valve 319 both function as a combined inlet into and outlet out of, respectively, the first booster portion 315 and the second booster portion 316; in other embodiments, at least one of the first or the second portion valves 318 and 319 may instead comprise a separate at least one inlet into, and separate at least one outlet out of, respectively, the first booster portion 315 and the second booster portion 316.

The booster piston 302 is slidably housed within the booster chamber 300. The booster piston 302 comprises a first side 320 and a second side 322. As described above, in the embodiment shown, the booster piston 302 has a curved polygon configuration generally corresponding to the curved polygon cross-section of the corresponding booster chamber 300 (best seen in FIG. 9) and provides a substantially fluid-tight seal between the first and second booster portions 315 and 316. However, in other embodiments, the shape and configuration of the booster pistons 302 may change depending on the cross-sectional shape of the corresponding booster chambers 300.

The booster piston 302 is coupled to the compression piston 262 via the booster cable 304 such that movement of the compression piston 262 caused by movement of the buoyant member 120 is transferred to corresponding movement of the booster piston 302 within the booster chamber 300. In the embodiment shown, the booster cable 304 comprises a first cable portion 330 and a second cable portion 332. The first cable portion 330 has a first end coupled to the first side 320 of the booster piston 302 and a second end coupled to the first side 270 of the compression piston 262. The second cable portion 332 has a first end coupled to the second side 322 of the booster piston 302 and a second end coupled to the second side 272 of the compression piston 262. The first and second cable portions 330 and 332 transfer the reciprocating movement of the compression piston 262 within the compression chamber 260 into corresponding but opposite reciprocating movement of the booster piston 302 within the booster chamber 300.

The first cable portion 330 of the booster cable 304 passes over the top pulley system 305 mounted to at least one of the booster chamber walls 311 proximate to the top end 310 of the booster chamber 300 and the top end 280 of the compression chamber 260. Similarly, the second cable portion 332 of the booster cable 304 passes over the bottom pulley system 306 mounted to at least one of the booster chamber walls 311 proximate to the bottom end 312 of the booster chamber 300 and the bottom end 282 of the compression chamber 260. In the embodiment shown, the top pulley system 305 comprises an inner pulley located within the booster chamber 300 and an outer pulley located within the compression chamber 260, and the first cable portion 330 passes across the booster chamber wall 311 through the first portion valve 318. Similarly, the bottom pulley system 306 comprises an inner pulley located within the booster chamber 300 and an outer pulley located within the compression chamber 260, and the second cable portion 332 passes across the booster chamber wall 311 through the second portion valve 319. In other embodiments, the top and bottom pulley systems 305 and 306 may comprise more or fewer pulleys and may instead comprise a single pulley located within the booster chamber wall 311 for example. Similarly, the first and second cable portions 330 and 332 may pass across the booster chamber walls 311 via another opening rather than the first and second portion valves 318 and 319.

The booster cable 304 comprises a thin cable made of steel having a diameter of 0.125 inches (or approximately 0.32 cm); in other embodiments, the booster cable 304 may be made of other materials and the diameter may range between approximately 0.125 and 0.5 inches (or between approximately 0.32 and 1.27 cm). The first cable portion 330 and the second cable portion 332 have a substantially identical lengths such that when the compression piston 262 is located within a centre of the length of the compression chamber 260, the booster piston 302 similarly located in a centre of a length of the booster chamber 300.

Figure 10A:
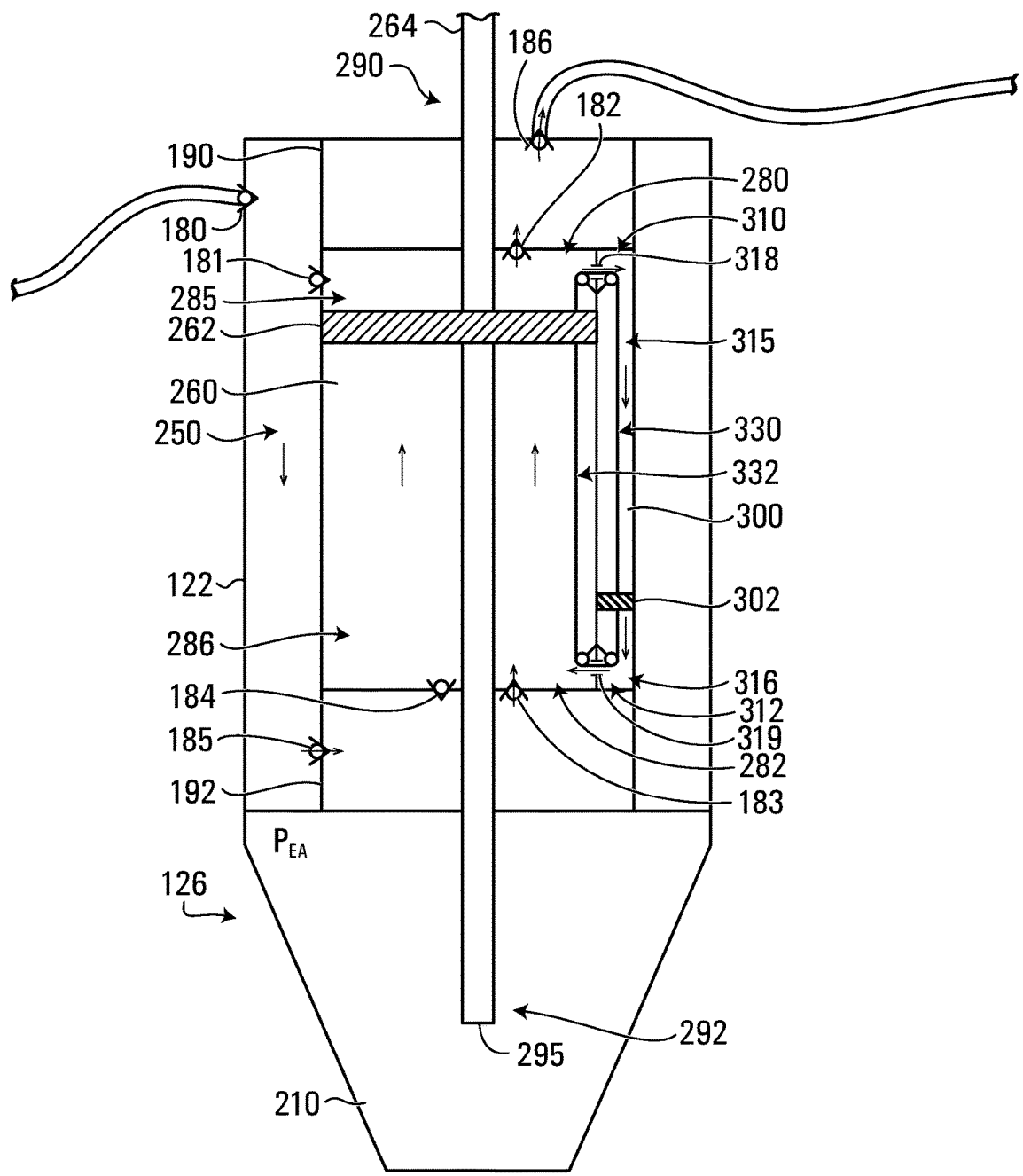
FIGS. 10A and 10B are side schematics of the subsystem of FIG. 8 with the compressor assembly in a compression stroke and in an expansion stroke according to one embodiment.
Figure 10B:
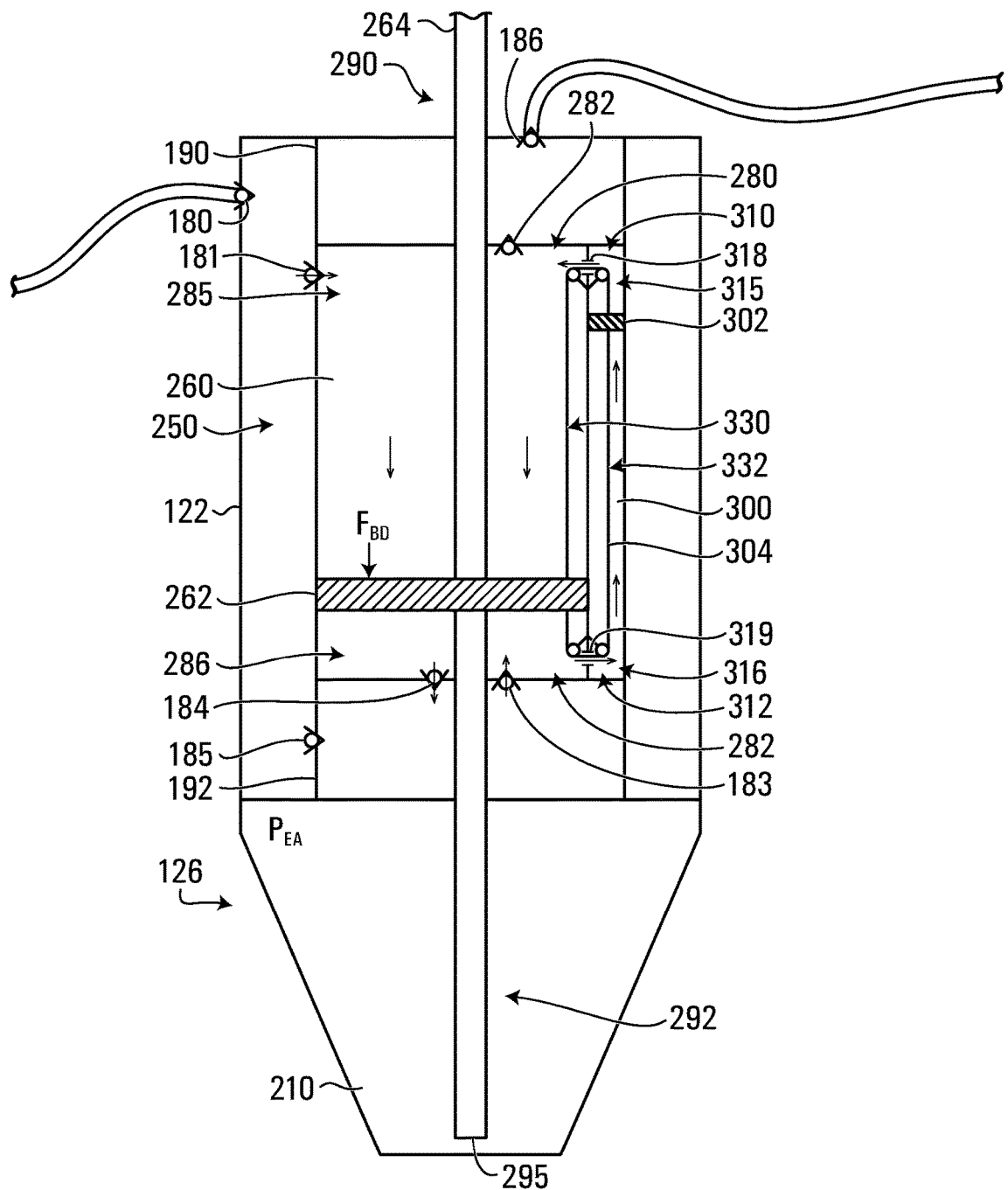

Referring now to FIGS. 8, 10A and 10B, the operation of the compressor assembly 250 and the booster systems 266 will be explained. Referring to FIG. 8, when the buoyant member 120 is floating on the surface of the body of water 101 at the equilibrium state, the compression piston 262 is positioned near the centre of the length of the compression chamber 260 and the booster pistons 302 are similarly positioned near the centre of the length of the respective booster chambers 300. The fluid 108 in the high-pressure portion 285, the low-pressure reservoir 192, and the low-pressure portion 286 of the compression chamber 260, and the fluid 108 in the respective first booster portions 315 of the booster chambers 300, and the respective second booster portions 316 of the booster chambers 300 may all be at or around the input pressure $P_{IN}$ of the subsystem 104. The fluid 108 in the high-pressure reservoir 190 may be at or around the output pressure $P_{OUT}$ of the subsystem 104 as compressed during a previous compression stroke of the compression piston 262. The terminal surface 295 of the second rod portion 292 is positioned within the equalizer assembly 126 when the compression piston 262 is in the equilibrium state.

Referring now to FIG. 10A, when the buoyant member 120 rises during a peak of a wave on the body of water 101, the compression piston 262 is moved towards the top end 280 of the compression chamber 260 by the upward vertical portion of the movement of the buoyant member 120 and enters the compression stroke. During this compression stroke, the fluid 108 within the high-pressure portion 285 is compressed from $P_{IN}$ to $P_{OUT}$ by the compression piston 262, and flows into the high-pressure reservoir 190 via the high-pressure outlet 182 after reaching or exceeding $P_{OUT}$. At the same time, during this compression stroke, as the compression piston 262 moves towards the top end 280 of the compression chamber 260: (a) the upward movement of the compression piston 262 pulls the booster piston 302 within the booster chamber 300 towards the bottom end 312 of the booster chamber 300 by pulling and applying tension to the second cable portion 332; (b) the fluid 108 within the high-pressure portion 285 at $P_{OUT}$ may also flow into the first booster portion 315 via the first portion valve 318 as the volume of the first booster portion 315 increases, such that the fluid 108 within the first booster portion 315 is also increased to the output pressure $P_{OUT}$, and (c) the fluid 108 within the second booster portion 316 at $P_{IN}$ may flow into the low-pressure portion 286 via the second portion valve 319 as the volume of the second booster portion 316 decreases and the volume of the low-pressure portion 286 increases. Again, at the same time, during this compression stroke, the fluid 108 within the low-pressure portion 286 decreases from $P_{IN}$ as the volume of the low-pressure portion 286 increases, which may draw the fluid 108 within the low-pressure reservoir 192 into the low-pressure portion 286 in via the low-pressure inlet 183 and which may in turn further draw the fluid 108 within the accumulating manifold 122 into the low-pressure reservoir 192 via the reservoir inlet 185. The terminal surface 295 of the second rod portion 292 remains within the equalizer assembly 126 during the compression stroke of the compression piston 262.

Referring now to FIG. 10B, when the buoyant member 120 subsequently falls during a trough of a wave on the body of water 101, the compression piston 262 is moved from the top end 280 and toward the bottom end 282 of the compression chamber 260 by the downward vertical portion of the movement of the buoyant member 120 and enters the expansion stroke. During this expansion stroke, the pressure of the fluid 108 within the high-pressure portion 285 may decrease from $P_{OUT}$ to $P_{IN}$ (or to less than $P_{IN}$) as the volume of the high-pressure portion 285 increases, which may draw the fluid 108 within the accumulating manifold 122 into the high-pressure portion 285 via the high-pressure inlet 181 to recharge the high-pressure portion 285. At the same time, during this expansion stroke, as the compression piston 262 moves towards the bottom end 282 of the compression chamber 260: (a) the downward movement of the compression piston 262 pulls the booster piston 302 within the booster chamber 300 towards the top end 310 of the booster chamber 300 by pulling and applying tension to the first cable portion 330; (b) the fluid 108 within the first booster portion 315 at $P_{OUT}$ may flow in to the high-pressure portion 285 via the first portion valve 318 as the volume of the first booster portion 315 decreases, which may recharge the high-pressure portion 285 with the fluid 108 at $P_{OUT}$ to apply an additional downward drive force $F_{BD}$ on the first side 270 of the compression piston 262 and accelerate the downward movement of the compression piston 262 toward the bottom end 282 of the compression chamber 260 and counteract the upward force $F_2$ (shown in FIG. 8) exerted by the fluid 108 at $P_{IN}$ within the low-pressure portion 286 on the second side 272 of the compression piston 262, and (c) the fluid 108 within the low-pressure portion 286 at $P_{IN}$ may flow into the second booster portion 316 via the second portion valve 319 as the volume of the second booster portion 316 increases while the volume of the low-pressure portion 286 decreases. Again, at the same time, during this expansion stroke, the fluid 108 within the low-pressure portion 286 increases from $P_{IN}$ as the volume of the low-pressure portion 286 decreases, which may force the fluid 108 within the low-pressure portion 286 into the low-pressure reservoir 192 in via the low-pressure outlet 184. The increase in pressure in the low-pressure reservoir 192 may also force the fluid 108 back into the low-pressure portion 286 via the low-pressure inlet 183. This may maintain equilibrium between the fluid 108 in the low-pressure reservoir 192 and the low-pressure portion 286 during the expansion stroke. Again, the terminal surface 295 of the second rod portion 292 remains within the equalizer assembly 126 during the expansion stroke of the compression piston 262.

As described above, during the compression stroke, the first booster portion 315 of the booster chamber 300 is charged with the fluid 108 compressed by the compression piston 262 to the higher $P_{OUT}$. This fluid 108 at $P_{OUT}$ is then recharged into the high-pressure portion 285 during the expansion stroke to provide the additional downward drive force $F_{BD}$ on the first side 270 of the compression piston 262 to encourage the compression piston 262 toward the bottom end 282 of the compression chamber 260 and to counteract any upward force $F_2$ caused by the fluid 108 within the low-pressure portion 286.

Referring now to FIGS. 11, 12, 13A and 13B, another embodiment of a compressor assembly which may be used within one or more of the subsystems 104 of the system 100 is shown generally at 350. Similar to the compressor assemblies 124 and 250 described previously, the compressor assembly 350 also includes a compression chamber 360, a compression piston 362 and a piston rod 364.

The compression chamber 360 includes a top end 380 and a bottom end 382, a length 381 extending between the top and bottom ends 380 and 382 and a diameter 383. In the embodiment shown, the length 381 is approximately is approximately 48 inches (or approximately 121.92 cm) and the diameter 383 is approximately 8 inches (or approximately 20.32 cm). The exact dimension of the length 381 and the diameter 383 of the compression chamber 360 may be selected based at least in part on the anticipated input pressure $P_{IN}$ received within a particular subsystem 104, the desired output pressure $P_{OUT}$ generated by the subsystem 104, and the anticipated height of the on the body of water 101. Additionally, the length 381 of compression chamber 360 across different stages 102 of the same system 100 may also be varied to account for increases or decreases in the anticipated $P_{IN}$ and the desired $P_{OUT}$.

The compression piston 362 is slidably housed within the compression chamber 360 and divides the compression chamber 360 into a variable volume high-pressure portion 385 and a variable volume low-pressure portion 386, wherein the volume of the high and low-pressure portions 385 and 386 depends on the position of the compression piston 362 along the length 381. The compression piston 362 includes a first side 370 and a second side 372 and generally defines a perimeter 374. In the embodiment shown, the compression piston 362 has a substantially circular configuration, and thus the perimeter 374 comprises a circumference. However, similar to the compression pistons 132 and 262 described previously, the shape of the compression piston 362 may also vary depending on the cross-sectional shape of the compression chamber 360.

The piston rod 364 includes a first rod portion 390 and a second rod portion 392. The first rod portion 390 of the piston rod 364 has a first end coupled to the buoyant member 120 and a second end coupled to the first side 370 of the compression piston 362. The second rod portion 392 of the piston rod 364 has a first end coupled to the second side 372 of the compression piston 362 and a second end with a terminal surface 395. The second rod portion 392 has a length sized such that the terminal surface 395 remains within the equalizer assembly 126 during an entire range of motion of the compression piston 362 between the top and bottom ends 380 and 382 of the compression chamber 360. In the embodiment shown, a diameter of the first rod portion 390 and the second rod portion 392 are identical; however, similar to the first and second rod portions 140 and 150 of the piston rod 134 described previously, in other embodiments and/or in certain stages 102 of a particular system 100, the diameters of the first and second rod portions 390 and 392 may be different. The coupling of the compression piston 362 to the buoyant member 120 (via the first rod portion 390) transfers the movement of the buoyant member 120 caused by the waves of the body of water 101 into corresponding movement of the compression piston 362 within the compression chamber 360 from the bottom end 382 to the top end 380 during a compression stroke of the compression piston 362 and from the top end 380 to the bottom end 382 during an expansion stroke of compression piston 362.

The compressor assembly 350 further includes a plurality of tension springs 366 coupled to the second side 372 of the compression piston 362. The plurality of tension springs 366 are configured to counteract any decrease in the efficiency and compressive power of the compressor assembly 350 when the compressor assembly 350 receives the fluid 108 at a relatively high input pressure $P_{IN}$, such as a $P_{IN}$ high enough to account for a mass of the compression piston 362, a mass of the piston rod 364 and the mass of the buoyant member 120 such that during the expansion stroke of the compression piston 362, the fluid 108 within the low-pressure portion 386 (alone or combined with the fluid 108 within the low-pressure reservoir 192) urges the compression piston 362 toward the top end 280, and/or prevents the compression piston 362 from reaching the bottom end 382 during the expansion stroke of the compression piston 362.

Figure 11:
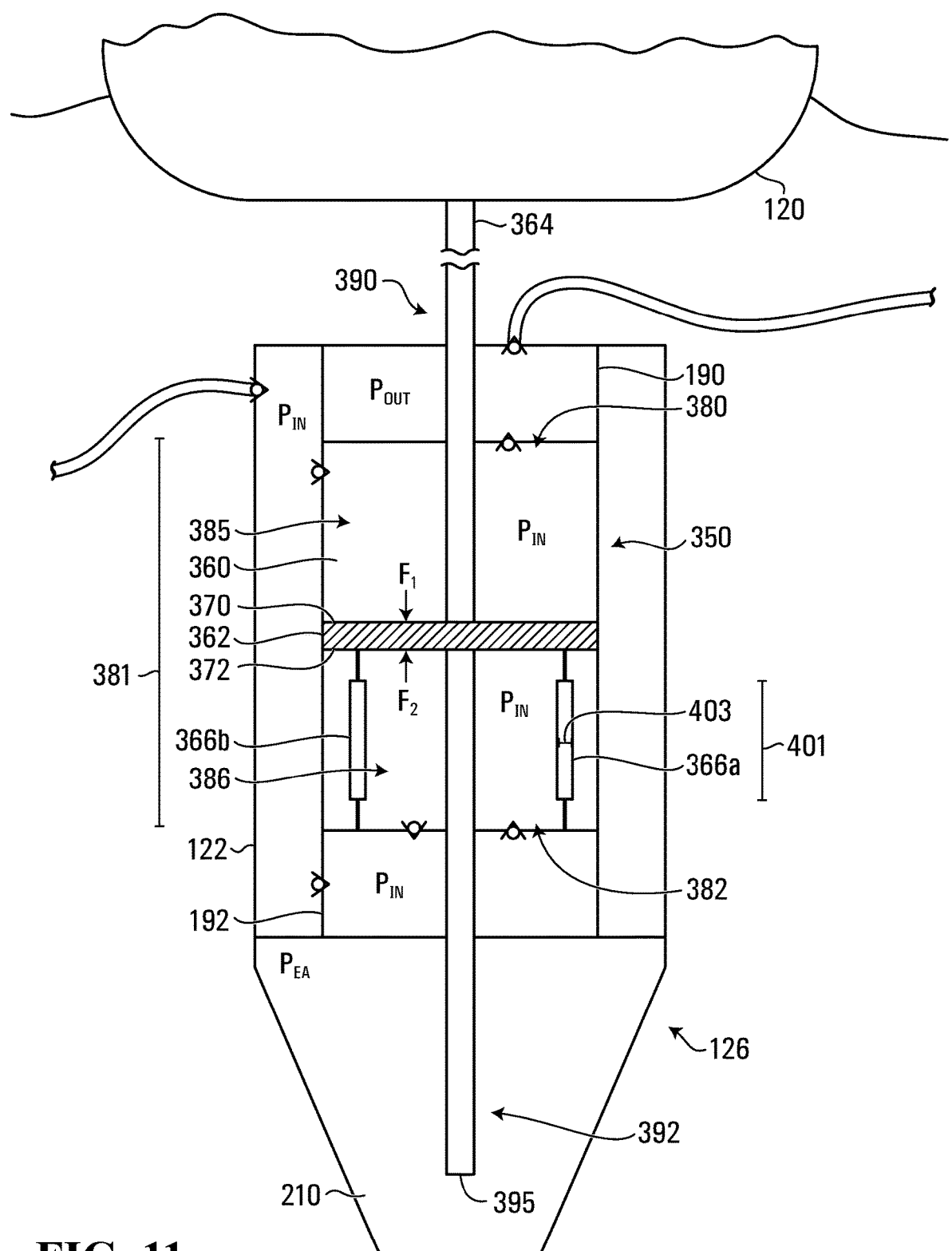
FIG. 11 is a side schematic of a subsystem of the wave energy generation system of FIG. 1 according to another embodiment.
Figure 12:
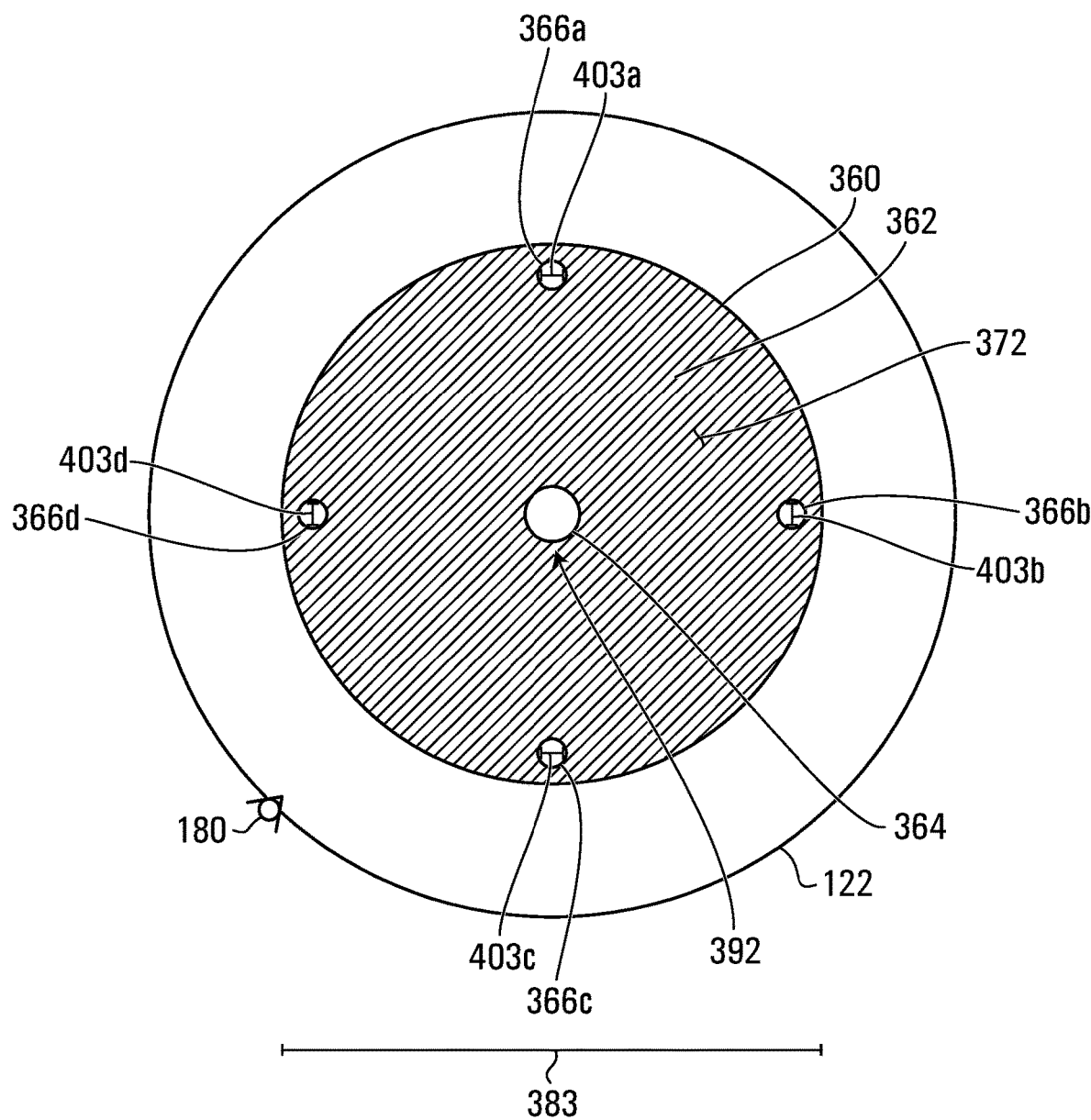
FIG. 12 is a bottom schematic of an accumulating manifold, a compressor assembly and a plurality of tensioned springs of the subsystem of FIG. 11.

Referring to FIG. 12, in the embodiment shown, the plurality of tension springs 366 includes four tension springs 366, including a first tension spring 366a located at the 12 o'clock position, a second tension spring 366b located at the 3 o'clock position, a third tension spring 366c located at the 6 o'clock position and a fourth tension spring 366d located at the 9 o'clock position; in other embodiments, the compressor assembly 350 may include fewer or more tension springs 366, and may include anywhere between 2 and 24 tension springs equidistantly distributed around the circumference 374 of the compression piston 362. The number of tension springs 366 may generally be selected based on the anticipated $P_{IN}$ or the desired $P_{OUT}$ of the current subsystem 104. For example, the compressor assembly 350 of subsystems 104 of the later stages 102 (such as the fourth subsystem 104d of the fourth stage 102d shown in FIG. 1 for example) which receive a relatively high $P_{IN}$ may include a larger number of the tension springs 366 to exert a greater amount of downward force $F_{SD}$ (shown in FIG. 13A) on the compression piston 362 during the expansion stroke of the compression piston 362 and a greater amount of upward force $F_{SU}$ (shown in FIG. 13B) during the compression stroke of the compression piston 362 and to reduce a surface area of the second side 372 of the compression piston 362 to reduce the baseline upward force $F_2$ (shown in FIG. 11) exerted by the fluid 108 at $P_{IN}$ within the low-pressure portion 386.

Each tension spring 366 has a respective a diameter 403, a respective equilibrium length 401 and a respective spring constant k. The equilibrium lengths 401 of the tension springs 366 may generally be selected to be at least half the length 381 the compression chamber 360, to urge the compression piston 362 towards the bottom end 382 of the compression chamber 360 during an expansion stroke after a compression stroke. The diameters 403 and the spring constants k of each tension spring 366 may also be generally selected based on the anticipated $P_{IN}$ or the desired $P_{OUT}$ of the current subsystem 104, and may generally be selected to sufficiently counteract any baseline upward force $F_2$ exerted by the fluid 108 at $P_{IN}$ within the low-pressure portion 386 by exerting the downward force $F_{SD}$ via the tension spring 366 during the expansion stroke and by reducing an amount of exposed surface area of the second side 372 of the compression piston 362 to reduce the baseline upward force $F_2$ exerted by the fluid 108. In the embodiment shown, each of the four tension springs 366 are identical to each other, have identical equilibrium lengths 401, have identical diameters 403 and have a material construction and structural configuration to achieve an identical spring constant k. The compressor assemblies 350 of the subsystems 104 forming the later stages 102 and which receive the fluid 108 at a relatively high $P_{IN}$ may include tension springs 366 having shorter equilibrium lengths 401, larger diameters 403, and higher absolute spring constants k, again to exert a greater amount of downward force $F_{SD}$ on the compression piston 362 and to take up a greater amount of the exposed surface area of the second side 372 the compression piston 362. In yet other embodiments, the tension springs 366 of a particular compressor assembly 350 may not be identical to each other, and may include different diameters 403 and different spring constants k. Using different tension springs 366 having different variables within a same compressor assembly 350 may allow greater granularity in controlling and adjusting the downward force $F_{SD}$ and the upward force $F_{SU}$ on the compression piston 362 caused by the tension springs 366 and greater granularity in controlling and adjusting the amount of exposed surface area on the second side 372 of the compression piston 362.

Figure 13A:
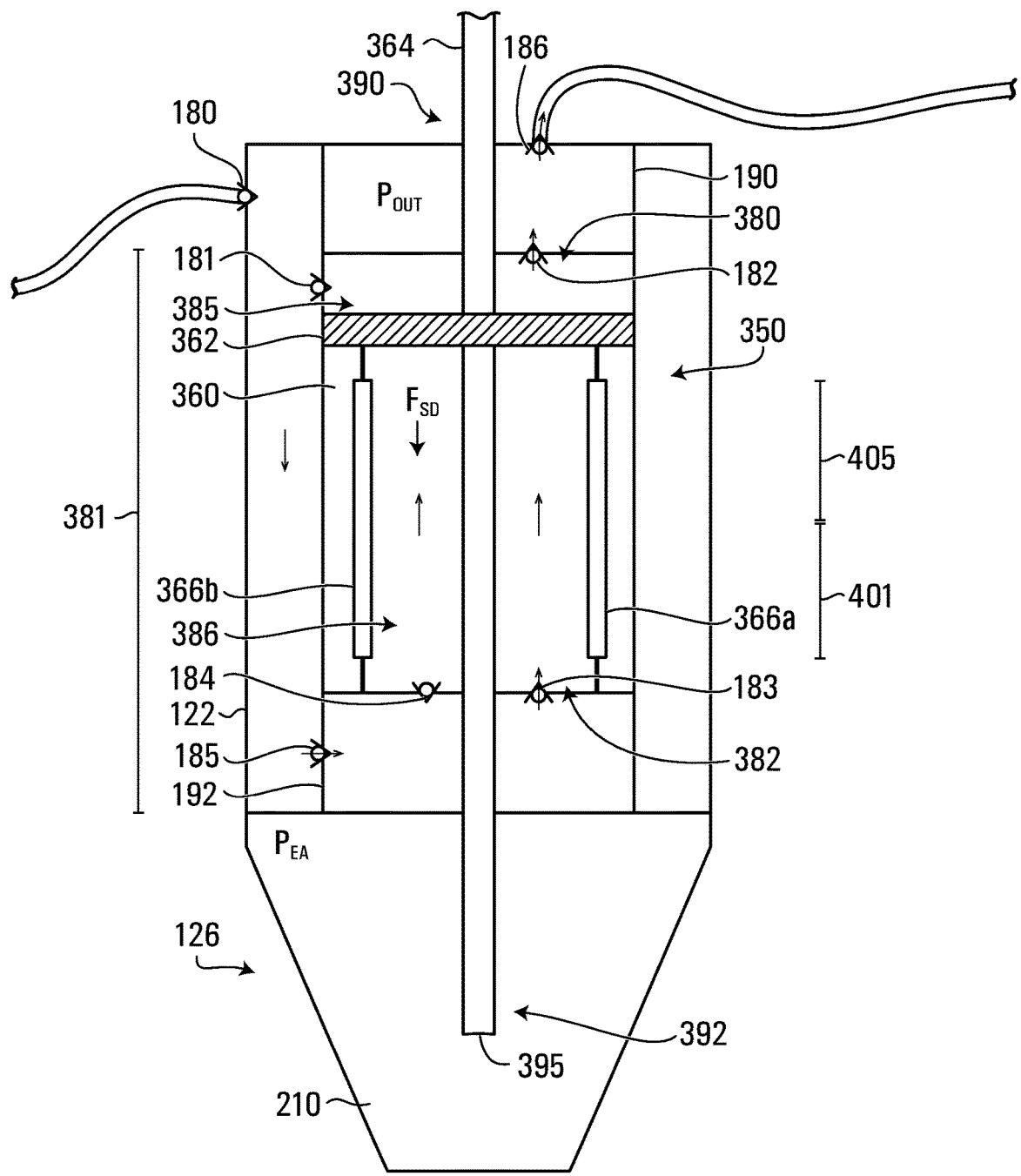
FIGS. 13A and 13B are side schematics of the subsystem of FIG. 11 with the compressor assembly in a compression stroke and in an expansion stroke according to one embodiment.
Figure 13B:
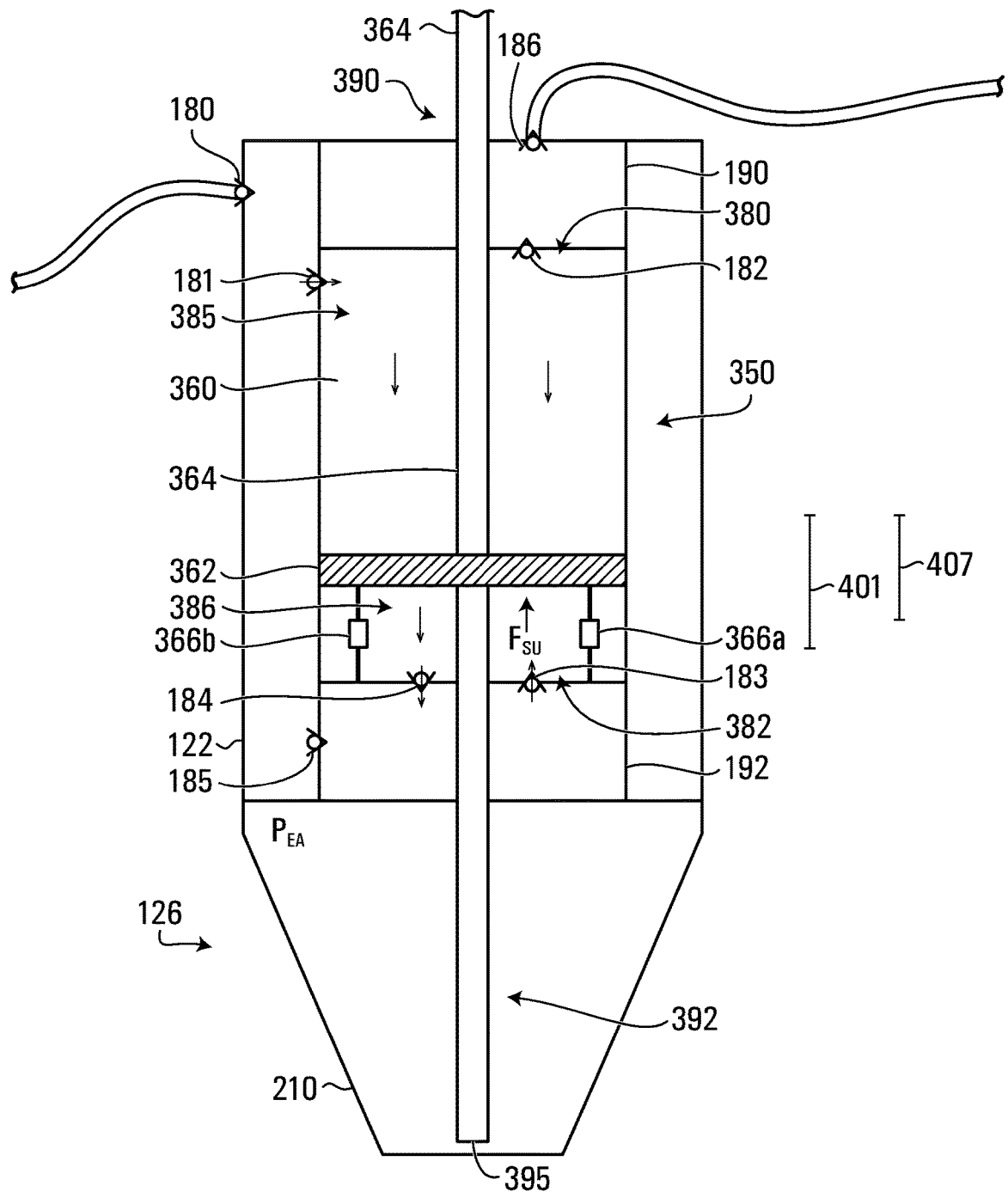

Referring now to FIGS. 11, 13A and 13B, the operation of the compressor assembly 350 including the plurality of tension springs 366 will be described. Referring to FIG. 11, when the buoyant member 120 is floating on the surface of the body of water 101 at the equilibrium state, the compression piston 362 is positioned near a centre of the length 381 of the compression chamber 360 and the tension springs 366 will also generally be at its equilibrium length 401 and not exert any downward force $F_{SD}$ or upward force $F_{SU}$ on the compression piston 362. The fluid 108 in the high-pressure portion 385, the low-pressure reservoir 192, and the low-pressure portion 386 may all be at or around the input pressure $P_{IN}$ of the subsystem 104. The fluid 108 in the high-pressure reservoir 190 may be at or around the output pressure $P_{OUT}$ of the subsystem 104 as compressed during a previous compression stroke of the compression piston 362. The terminal surface 395 of the second rod portion 392 is positioned within the equalizer assembly 126 when the compression piston 362 is in the equilibrium state.

Referring now to FIG. 13A, when the buoyant member 120 rises during a peak of a wave on the body of water 101, the compression piston 362 is moved towards the top end 380 of the compression chamber 360 by the upward vertical portion of the movement of the buoyant member 120 and enters the compression stroke. During this compression stroke, the fluid 108 within the high-pressure portion 385 is compressed from $P_{IN}$ toward $P_{OUT}$ by the compression piston 362, and flows into the high-pressure reservoir 190 via the high-pressure outlet 182 after reaching or exceeding $P_{OUT}$. At the same time, during this compression stroke, as the compression piston 362 is displaced towards the top end 380, the tension springs 366 are displaced past their respective equilibrium lengths 401 by an extension distance 405 equal to the displacement distance of the compression piston 362, which causes the tension spring 366 to exert the downward force $F_{SD}$ on the compression piston 362 proportional to the extension distance 405 and the spring constant k of the tension spring 366, generally urging the compression piston 362 back down towards the bottom end 382. Also at the same time, during this compression stroke, the fluid 108 within the low-pressure portion 386 decreases from $P_{IN}$ as the volume of the low-pressure portion 386 increases, which may draw the fluid 108 within the low-pressure reservoir 192 into the low-pressure portion 386 in via the low-pressure inlet 183 to recharge the low-pressure portion 386 and which may in turn draw the fluid 108 within the accumulating manifold 122 into the low-pressure reservoir 192 via the reservoir inlet 185 to recharge the low-pressure reservoir 192. Again, the terminal surface 395 of the second rod portion 392 remains within the equalizer assembly 126 during the compression stroke of the compression piston 362.

Referring now to FIG. 13B, when the buoyant member 120 subsequently falls during a trough of a wave on the body of water 101, the compression piston 362 is moved from the top end 380 and toward the bottom end 382 of the compression chamber 360 by the downward vertical portion of the movement of the buoyant member 120 and enters the expansion stroke. During this expansion stroke, the pressure of the fluid 108 within the high-pressure portion 285 may decrease from $P_{OUT}$ to $P_{IN}$ (or to less than $P_{IN}$) as the volume of the high-pressure portion 385 increases, which may draw the fluid 108 within the accumulating manifold 122 into the high-pressure portion 385 via the high-pressure inlet 181 to recharge the high-pressure portion 385. At the same time, during this expansion stroke, movement of the compression piston 362 toward the bottom end 282 may be aided or accelerated by the downward force $F_{SD}$ exerted on the compression piston 362 by the tension springs 366 described above. Accordingly, during the expansion strokes, any baseline upward force $F_2$ caused by the fluid 108 at $P_{IN}$ within the low-pressure portion 386 may be counteracted by the downward force $F_{SD}$ generated by the tension springs 366, which may increase the efficiency and compressive power of the compressor assembly 350 during the compression stroke. Additionally, also during this expansion stroke, the fluid 108 within the low-pressure portion 386 may increase to $P_{IN}$ (or to greater than $P_{IN}$) as the volume of the low-pressure portion 386 decreases, which may force the fluid 108 within the low-pressure portion 386 into the low-pressure reservoir 192 via the low-pressure outlet 184. The increase in pressure in the low-pressure reservoir 192 may also force the fluid 108 back into the low-pressure portion 386 via the low-pressure inlet 183. This maintains equilibrium between the fluid 108 within the low-pressure portion 386 and the low-pressure reservoir 192 during the expansion stroke. Again, the terminal surface 395 of the second rod portion 392 remains within the equalizer assembly 126 during the expansion stroke of the compression piston 362.

In the embodiment shown, subsequent compression and expansion strokes of the compression piston 362 may benefit from oscillation motion of the plurality of tension springs 366. In this respect, during an expansion stroke, the tension springs 366 may provide a downward force $F_{SD}$ boosting or accelerating downward motion of the compression piston 362 towards the bottom end 382 after the tension springs 366 are extended past their respective equilibrium lengths 401 by the extension distance 405 during a previous compression stroke. This downward force $F_{SD}$ may in turn compress the tension springs 366 past their respective equilibrium length 401 by a compression distance 407, which generally causes the tensions springs 366 to exert the upward force $F_{SU}$ on the compression piston 362 proportional to the compression distance 407 and the spring constant k of the tension spring 366, generally urging the compression piston 362 upwards back towards the top end 380 to boost or accelerate a subsequent compression stroke.

While specific embodiments have been described and illustrated, such embodiments should be considered illustrative of the subject matter described herein and not as limiting the claims as construed in accordance with the relevant jurisprudence.

Embodiments in which an exclusive property or privilege is claimed are defined as follows:

1. A system for further pressurizing pressurized fluid using motion of waves on a surface of a body of water, the pressurized fluid being pressurized by a previous compressor assembly and the system comprising:
    a compressor assembly comprising:
        a compression chamber having a top end and a bottom end;
        a compression piston having a first side and a second side, wherein the compression piston is slidably housed within the compression chamber; and
        a piston rod comprising:
            a first rod portion having a first end coupled to a buoyant member floating on the surface of the body of water and a second end coupled to the first side of the compression piston, wherein movement of the buoyant member is transferred, via the first rod portion, into movement of the compression piston between the top end and the bottom end; and
            a second rod portion having a first end coupled to the second side of the compression piston and a second end including a terminal surface, and wherein a diameter of the second rod portion is equal to or greater than a diameter of the first rod portion; and
    an equalizer assembly comprising an equalizer chamber maintained at an equalization pressure, wherein the second rod portion is sized such that the terminal surface is located in the equalizer chamber during an entire range of motion of the compression piston between the top end and the bottom end, and wherein fluid in the equalizer chamber at the equalization pressure exerts a negligible force on the terminal surface during the entire range of motion of the compression piston.

2. The system of claim 1, wherein the equalizer chamber comprises one of:
    a rigid chamber defining a constant volume; and
    a deformable chamber defining a variable volume.

3. The system of claim 1, wherein the diameter of the first rod portion is equal to the diameter of the second rod portion.

4. The system of claim 1, wherein the compression piston divides the compression chamber into a high-pressure portion and a low-pressure portion.

5. The system of claim 4, wherein the fluid in the low-pressure portion exerts a baseline force on the compression piston towards the top end of the compression chamber.

6. The system of claim 1, further comprising a plurality of booster systems, each booster system comprising:
    a booster chamber having a top end and a bottom end;
    a booster piston having a first side and a second side, wherein the booster piston is slidably housed within the booster chamber;
    a cable comprising:
        a first cable portion coupling the first side of the booster piston with the first side of the compression piston; and
        a second cable portion coupling the second side of the booster piston with the second side of the compression piston, wherein movement of the compression piston within the compression chamber is transferred as corresponding and opposite movement of the booster piston within the booster chamber.

7. The system of claim 6, wherein the booster piston divides the booster chamber into a first booster portion and a second booster portion.

8. The system of claim 7, wherein the first booster portion is in fluid communication with the compression chamber such that the fluid within the compression chamber flows into the first booster portion when the compression piston moves away from the bottom end of the compression chamber and towards the top end of the compression chamber and the fluid within the first booster portion flows into the compression chamber when the compression piston moves away from the top end of the compression chamber and towards the bottom end of the compression chamber.

9. The system of claim 1, further comprising a plurality of tension springs coupled to a bottom wall of the compression chamber and to the second side of the compression piston, wherein the plurality of tension springs exert a force on the compression piston towards the bottom end of the compression chamber when the compression piston moves away from the bottom end of the compression chamber and towards the top end of the compression chamber.

10. A method for further pressurizing pressurized fluid within a compressor assembly using motion of waves on a surface of a body of water, the pressurized fluid being pressurized by a previous compressor assembly, the method comprising:
    moving a compression piston of the compressor assembly away from a bottom end of a compression chamber and towards a top end of the compression chamber in response to a buoyant member floating on the surface rising due to an upward motion of the waves,
        wherein a first side of the compression piston is coupled to the buoyant member via a first rod portion of a piston rod, and
        wherein a second side of the compression piston is coupled to a second rod portion of the piston rod, the second rod portion sized such that a terminal surface of the second rod portion is located within an equalizer chamber of an equalizer assembly during an entire range of motion of the compression piston between the top end and the bottom end and a diameter of the second rod portion is equal to or greater than a diameter of the first rod portion,
    the equalizer chamber is maintained at an equalization pressure such that fluid in the equalizer chamber at the equalization pressure exerts a negligible force on the terminal surface during the entire range of motion of the compression piston; and
    moving the compression piston away from the top end and towards the bottom end in response to the buoyant member falling due to a downward motion of the waves.

11. The method of claim 10, wherein the equalizer chamber comprises one of:
    a rigid chamber defining a constant volume;
    a deformable chamber defining a variable volume.

12. The method of claim 10, wherein the diameter of the first rod portion is equal to the diameter of the second rod portion.

13. The method of claim 10, wherein the compression piston divides the compression chamber into a high-pressure portion and a low-pressure portion.

14. The method of claim 13, wherein the fluid in the low-pressure portion exerts a baseline force on the compression piston towards the top end.

15. The method of claim 10, wherein the compressor assembly further comprises a plurality of booster systems, each booster system comprising a booster piston having a first side coupled with the first side of compression piston via a first cable portion and a second side coupled with the second side of the compression piston via a second cable portion such that:

moving the compression piston away from the bottom end of the compression chamber and towards to the top end of the compression chamber moves the booster piston away from a top end of a booster chamber and towards a bottom end of the booster chamber; and moving the compression piston away from the top end of the compression chamber and towards the bottom end of the compression chamber moves the booster piston away from the bottom end of the booster chamber and towards the top end of the booster chamber.

16. The method of claim 15, wherein the booster piston divides the booster chamber into a first booster portion and a second booster portion.

17. The method of claim 16, wherein the first booster portion is in fluid communication with the compression chamber such that:

moving the compression piston away from the bottom end of the compression chamber and towards to the top end of the compression chamber causes the fluid within the compression chamber to flow into the first booster portion; and moving the compression piston away from the top end of the compression chamber and towards the bottom end of the compression chamber causes the fluid within the first booster portion to flow into the compression chamber.

18. The method of claim 10, further comprising a plurality of tension springs coupled to a bottom wall of the compression chamber and the second side of the compression piston, wherein moving the compression piston away from the bottom end of the compression chamber and towards the top end of the compression chamber causes the plurality of tension springs to exert a force on the compression piston towards the bottom end of the compression chamber.

19. The system of claim 5, wherein the negligible force exerted on the terminal surface by the fluid in the equalizer chamber is less than the baseline force exerted on the compression piston by the fluid in the low-pressure portion.

20. The system of claim 5, wherein the negligible force exerted on the terminal surface by the fluid in the equalizer chamber is at least ten times less than the baseline force exerted on the compression piston by the fluid in the low-pressure portion.

* * * * *